US012752776B2

(12) United States Patent
Aizawa

(10) Patent No.: US 12,752,776 B2
(45) Date of Patent: Oct. 6, 2026

(54) MOVING OBJECT CONTROL SYSTEM, CONTROL METHOD THEREOF, STORAGE MEDIUM, AND MOVING OBJECT

(71) Applicant: HONDA MOTOR CO., LTD., Tokyo (JP)

(72) Inventor: Koki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 18/592,895

(22) Filed: Mar. 1, 2024

(65) Prior Publication Data

US 2024/0300482 A1 Sep. 12, 2024

(30) Foreign Application Priority Data

Mar. 8, 2023 (JP) ................................ 2023-035849

(51) Int. Cl.
*B60W 30/09* (2012.01)
*B60W 60/00* (2020.01)

(52) U.S. Cl.
CPC ......... *B60W 30/09* (2013.01); *B60W 60/0015* (2020.02); *B60W 2420/403* (2013.01); *B60W 2556/40* (2020.02)

(58) Field of Classification Search
CPC ............. B60W 30/09; B60W 60/0015; B60W 2556/40
See application file for complete search history.

(56) References Cited

U.S. PATENT DOCUMENTS

| | | | | |
|---|---|---|---|---|
| 10,222,801 B2 * | 3/2019 | Oba | ................... | B62D 15/0285 |
| 11,207,780 B2 | 12/2021 | Moriya et al. | | |
| 12,097,858 B2 * | 9/2024 | Tsuji | ................... | B60W 60/001 |
| 2018/0011489 A1 * | 1/2018 | Oba | ................... | B62D 15/025 |
| 2019/0375104 A1 * | 12/2019 | Moriya | ................... | B25J 9/1676 |

(Continued)

FOREIGN PATENT DOCUMENTS

| | | |
|---|---|---|
| JP | 2001306143 A * | 11/2001 |
| JP | 2016-206979 A | 12/2016 |
| JP | 2018-002082 A | 1/2018 |

(Continued)

OTHER PUBLICATIONS

Machine Translation of Sato's reference (JP-2001-306143-A) (Year: 2001).*

(Continued)

*Primary Examiner* — Tarek Elarabi
(74) *Attorney, Agent, or Firm* — THOMAS | HORSTEMEYER, LLP

(57) ABSTRACT

The present invention is directed to a moving object control system comprising: setting a current position and a target position of a moving object; generating a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and converting the generated first path into the xy coordinates in which an advancing direction of the moving object is defined as an x-axis and an axis orthogonal to the x-axis is defined as a y-axis.

7 Claims, 15 Drawing Sheets

(56) References Cited

U.S. PATENT DOCUMENTS

| | | | | |
|---|---|---|---|---|
| 2022/0332554 | A1* | 10/2022 | Fujishima | G01S 17/42 |
| 2024/0262363 | A1* | 8/2024 | Tsuji | B60W 40/06 |

FOREIGN PATENT DOCUMENTS

| | | | |
|---|---|---|---|
| JP | 2019-214084 | A | 12/2019 |
| JP | 2020-057311 | A | 4/2020 |
| JP | 2022-160941 | A | 10/2022 |

OTHER PUBLICATIONS

Japanese Office Action for Japanese Patent Application No. 2023035849 mailed Jul. 16, 2024 (partially translated).
Japanese Office Action for Japanese Patent Application No. 2023035849 mailed Nov. 1, 2024 (partially translated).

* cited by examiner

MOVING OBJECT CONTROL SYSTEM, CONTROL METHOD THEREOF, STORAGE MEDIUM, AND MOVING OBJECT

CROSS-REFERENCE TO RELATED APPLICATION(S)

This application claims priority to and the benefit of Japanese Patent Application No. 2023-035849, filed Mar. 8, 2023, the entire disclosure of which is incorporated herein by reference.

BACKGROUND OF THE INVENTION

Field of the Invention

The present invention relates to a moving object control system, a control method thereof, a storage medium, and a moving object.

Description of the Related Art

In these years, compact moving objects are known such as electric vehicles called ultra-compact mobility vehicles (also referred to as micro mobility vehicles) each having a riding capacity of about one or two persons, and mobile robots that provide various types of services to humans. Some of such moving objects autonomously travel while periodically generating a traveling path to a destination.

Japanese Patent Laid-Open No. 2018-2082 proposes a moving path generation apparatus that sets a comfortable moving path in which a load applied to an occupant is reduced. Specifically, the moving path generation apparatus sets a traveling track having a smallest degree of curvature change per traveling distance based on an angle formed by an advancing direction of a vehicle at a current position and an advancing direction of the vehicle at a target position, and a curvature of a traveling track and a traveling distance according to a steering angle of the vehicle.

SUMMARY OF THE INVENTION

The micro mobility vehicles include, for example, a three-wheeled vehicle including a front wheel and a tail wheel (driven wheel) that operates following driving of the front wheel. In such a vehicle, there is a possibility that turning will occur on the spot according to a target value of a posture angle of the vehicle at the start of traveling or at the time of arrival determination. When the turning occurs on the spot, an angle of the tail wheel increases, which adversely affects a riding comfort of the occupant. In addition, a compact micro mobility vehicle needs to suppress the use of hardware resources as much as possible. Therefore, it is desirable to reduce a processing amount at the time of generating the traveling path as much as possible and to efficiently use limited hardware resources.

The present invention has been made in view of the above problems, and generates a traveling path in consideration of a position and a posture of a vehicle at low calculation cost.

According to one aspect the present invention, there is provided a moving object control system comprises: a setting unit configured to set a current position and a target position of a moving object; a path generation unit configured to generate a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and a conversion unit configured to convert the generated first path into the xy coordinates in which an advancing direction of the moving object is defined as an x-axis and an axis orthogonal to the x-axis is defined as a y-axis.

According to another aspect the present invention, there is provided a control method of a moving object control system, comprising: a setting step of setting a current position and a target position of a moving object; a path generation step of generating a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and a conversion step of converting the generated first path into the xy coordinates in which an advancing direction of the moving object is defined as an x-axis and an axis orthogonal to the x-axis is defined as a y-axis.

According to still another aspect the present invention, there is provided a non-transitory storage medium storing a program for causing a computer to function as: a setting unit configured to set a current position and a target position of a moving object; a path generation unit configured to generate a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and a conversion unit configured to convert the generated first path into the xy coordinates in which an advancing direction of the moving object is defined as an x-axis and an axis orthogonal to the x-axis is defined as a y-axis.

According to yet still another aspect the present invention, there is provided a moving object comprising: a setting unit configured to set a current position and a target position of the moving object; a path generation unit configured to generate a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and a conversion unit configured to convert the generated first path into the xy coordinates in which an advancing direction of the moving object is defined as an x-axis and an axis orthogonal to the x-axis is defined as a y-axis.

Further features of the present invention will become apparent from the following description of exemplary embodiments (with reference to the attached drawings).

DESCRIPTION OF THE EMBODIMENTS

Figure 1A:
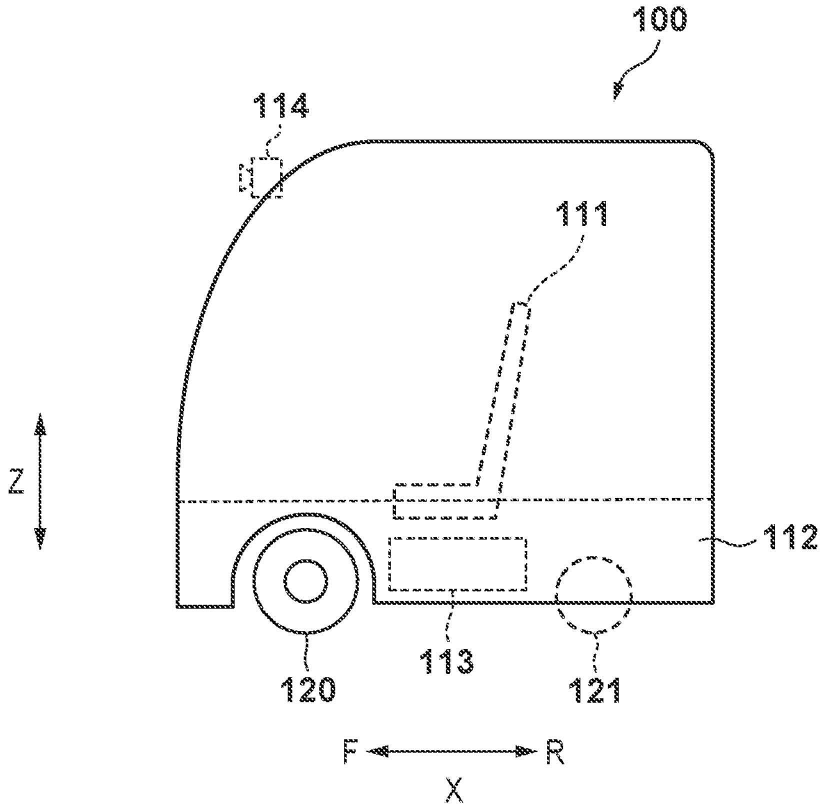
FIGS. 1A and 1B are block diagrams illustrating a hardware configuration example of a moving object according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Configuration of Moving Object>

Figure 1B:
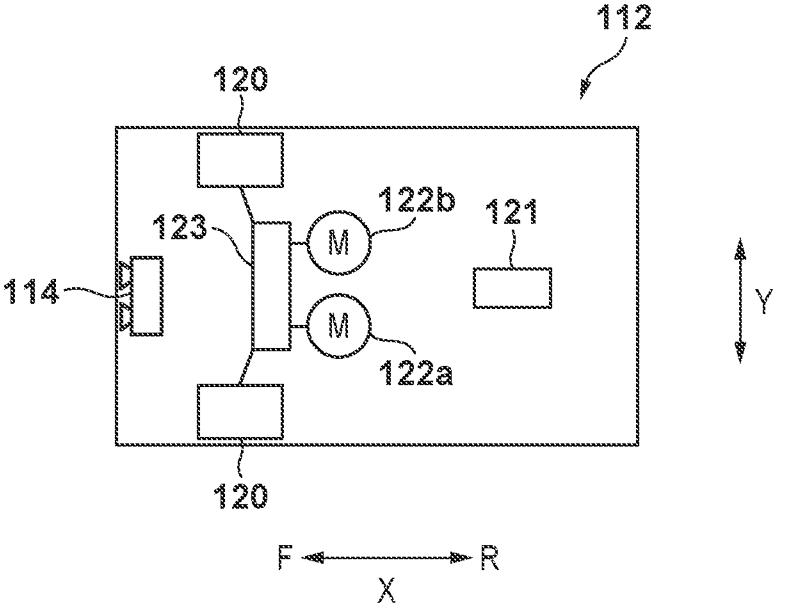

A configuration of a moving object 100 according to the present embodiment will be described with reference to FIGS. 1A and 1B. FIG. 1A illustrates a side surface of the moving object 100 according to the present embodiment, and FIG. 1B illustrates an internal configuration of the moving object 100. In the drawings, an arrow X indicates a front-and-rear direction of the moving object 100, F indicates the front, and R indicates the rear. An arrow Y indicates a width direction (a left-and-right direction) of the moving object 100, and an arrow Z indicates an up-and-down direction of the moving object 100.

The moving object 100 is equipped with a battery 113, and is, for example, an ultra-compact mobility vehicle that moves mainly by the power of a motor. The ultra-compact mobility vehicle is an ultra-compact vehicle that is more compact than a general automobile and has a riding capacity of about one or two persons. In addition to a roadway and a sidewalk, the moving object 100 can also travel in a site of various facilities, a public open space, and the like. In the present embodiment, an ultra-compact mobility vehicle with three wheels will be described as an example of the moving object 100, but there is no intention to limit the present invention, and for example, a four-wheeled vehicle or a straddle type vehicle may be used. Further, the vehicle of the present invention is not limited to a vehicle, and may be a vehicle loaded with luggage and traveling alongside a person who is walking, or a vehicle leading a person. Furthermore, the present invention, without being limited to a four-wheeled or two-wheeled vehicle, is also applicable to a walking robot or the like capable of autonomously moving.

The moving object 100 is an electric autonomous vehicle including a traveling unit 112 and using a battery 113 as a main power supply. The battery 113 is, for example, a secondary battery such as a lithium ion battery, and the moving object 100 autonomously travels by the traveling unit 112 by electric power supplied from the battery 113. The traveling unit 112 is a three-wheeled vehicle including a pair of left and right front wheels 120 and a tail wheel (driven wheel) 121. The traveling unit 112 may be in another form, such as a four-wheeled vehicle. The moving object 100 includes a seat 111 for one person or two persons.

The traveling unit 112 includes a steering mechanism 123. The steering mechanism 123 uses motors **122*a* and 122*b* as a drive source to change a steering angle of the pair of front wheels 120. An advancing direction of the moving object 100 can be changed by changing the steering angle of the pair of front wheels 120. The tail wheel 121 is a driven wheel that does not individually have a drive source but operates following driving of the pair of front wheels 120. Further, the tail wheel 121 is connected to a vehicle body of the moving object 100 with a turning portion. The turning portion rotates such that an orientation of the tail wheel 121 changes separately from the rotation of the tail wheel 121. In this manner, the moving object 100** according to the present embodiment adopts a differential two-wheeled mobility vehicle with the tail wheel, but is not limited thereto.

The moving object 100 includes a detection unit 114 that recognizes a plane in front of the moving object 100. The detection unit 114 is an external sensor that monitors the front of the moving object 100, and is an imaging apparatus that captures an image of the front of the moving object 100 in the case of the present embodiment. In the present embodiment, a stereo camera having an optical system such as two lenses and respective image sensors will be described as an example of the detection unit 114. However, instead of or in addition to the imaging apparatus, a radar or a light detection and ranging (LiDAR) can also be used. Further, an example in which the detection unit 114 is provided only in front of the moving object 100 will be described in the present embodiment, but there is no intention to limit the present invention, and the detection unit 114 may be provided at the rear, the left, or right of the moving object 100.

The moving object 100 according to the present embodiment captures an image of a front region of the moving object 100 using the detection unit 114, and detects an obstacle or a topography (intersection) from the captured image. Furthermore, the moving object 100 can divide a peripheral region of the moving object 100 into grids, and control traveling while generating an occupancy grid map in which obstacle information is accumulated in each of the grids. Note that the occupancy grid map is generated in sidewalk traveling, traveling in a facility, or the like, and is useful for making a path plan for avoiding an obstacle. On the other hand, in roadway traveling, it is not always necessary to generate the occupancy grid map because a path plan is made by recognizing a road structure. However, even in the roadway traveling, the occupancy grid map may be generated by regarding a boundary of a lane, a parked vehicle, or the like as an obstacle, and the occupancy grid map may be used for a path plan including a lane change for avoiding the obstacle. That is, in the present invention in which a global path is generated by a polynomial curve, it is not always necessary to generate the occupancy grid map, but it is desirable to generate the occupancy grid map in a traveling scene in which there is a possibility that an obstacle exists. Details of the occupancy grid map will be described later.

<Control Configuration of Moving Object>

Figure 2:
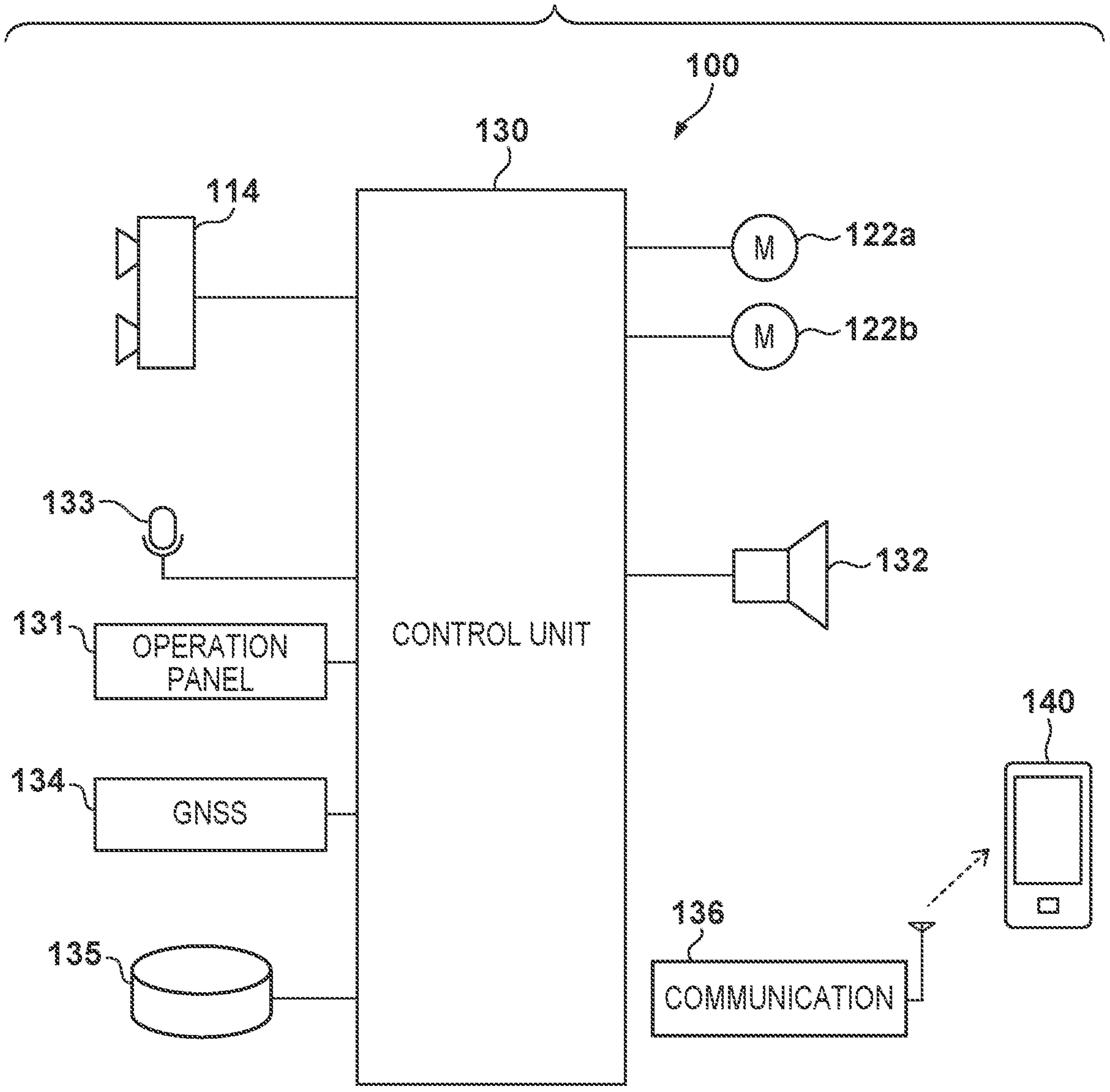
FIG. 2 is a block diagram illustrating a control configuration of the moving object according to the embodiment.

FIG. 2 is a block diagram of a control system of the moving object 100 according to the present embodiment. Here, a configuration necessary for carrying out the present invention will be mainly described. Therefore, any other configuration may be further included in addition to the configuration to be described below. Further, a description is given in the present embodiment assuming that each unit to be described below is included in the moving object 100, but there is no intention to limit the present invention, and a moving object control system including a plurality of devices may be achieved. For example, some functions of a control unit 130 may be achieved by a server apparatus connected to be capable of communicating with each other, or the detection unit 114 or a GNSS sensor 134 may be provided as an external device. The moving object 100 includes the control unit (ECU) 130. The control unit 130 includes a processor represented by a CPU, a storage device such as a semiconductor memory, an interface with an external device, and the like. The storage device stores a program executed by the processor, data used for processing by the processor, and the like. A plurality of sets of the processor, the storage device, and the interface may be provided for each function of the moving object 100 to be communicable with one another.

The control unit 130 acquires a detection result of the detection unit 114, input information of an operation panel 131, voice information input from a voice input apparatus 133, position information from the GNSS sensor 134, and reception information via a communication unit 136, and executes corresponding processing. The control unit 130 performs control of the motors 122*a* and 122*b* (traveling control of the traveling unit 112), display control of the operation panel 131, notification to an occupant of the moving object 100 by voice of a speaker 132, and output of information.

The voice input apparatus 133 can collect a voice of the occupant of the moving object 100. The control unit 130 can recognize the input voice and execute processing corresponding to the recognized input voice. A global navigation satellite system (GNSS) sensor 134 receives a GNSS signal, and detects the current position of the moving object 100. A storage apparatus 135 is a storage device that stores a captured image by the detection unit 114, obstacle (target) information, a path generated in the past, an occupancy grid map, and the like. The storage apparatus 135 may also store programs to be executed by the processors, data to be used by the processors for processing, and the like. The storage apparatus 135 may store various parameters (for example, learned parameters of a deep neural network, hyperparameters, and the like) of a machine learning model for voice recognition or image recognition to be executed by the control unit 130.

The communication unit 136 communicates with a communication apparatus 140, which is an external apparatus, via wireless communication such as Wi-Fi or 5th generation mobile communication. The communication apparatus 140 is, for example, a smartphone, but is not limited thereto, and may be an earphone type communication terminal, a personal computer, a tablet terminal, a game machine, or the like. The communication apparatus 140 is connected to a network via wireless communication such as Wi-Fi or 5th generation mobile communication.

A user who owns the communication apparatus 140 can give an instruction to the moving object 100 via the communication apparatus 140. The instruction includes, for example, an instruction for calling the moving object 100 to a position desired by the user for joining. When receiving the instruction, the moving object 100 sets a target position based on position information included in the instruction. Note that, in addition to such an instruction, the moving object 100 can set the target position from the captured image of the detection unit 114, or can set the target position based on an instruction, received via the operation panel 131, from the user riding on the moving object 100. In a case of setting the target position from the captured image, for example, a person who raises his/her hand for the moving object 100 is detected in the captured image, and the position of the detected person is estimated and set as the target position.

<Functional Configuration of Moving Object>

Figure 3:
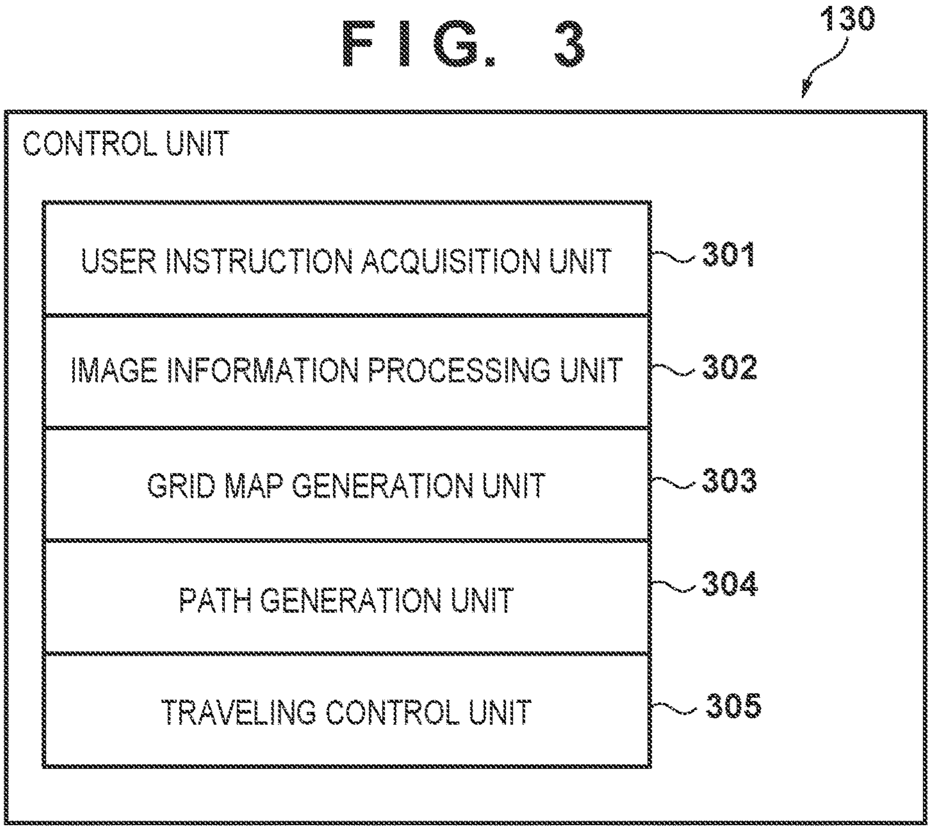
FIG. 3 is a block diagram illustrating a functional configuration of the moving object according to the embodiment.

Next, functional configurations of the moving object 100 according to the present embodiment will be described with reference to FIG. 3. The functional configurations described here are achieved by, for example, the CPU in the control unit 130 reading a program stored in a memory such as a ROM into a RAM and executing the program. Note that the functional configurations described below describe only functions necessary for describing the present invention, and do not describe all of functional configurations actually included in the moving object 100. That is, the functional configuration of the moving object 100 according to the present invention is not limited to the functional configuration to be described below.

A user instruction acquisition unit 301 has a function of receiving an instruction from a user, and can receive a user instruction via the operation panel 131, a user instruction from an external apparatus such as the communication apparatus 140 via the communication unit 136, and an instruction by an utterance of the user via the voice input apparatus 133. As described above, the user instruction includes an instruction to set a target position (also referred to as a destination) of the moving object 100 and an instruction related to the traveling control of the moving object 100.

An image information processing unit 302 processes the captured image acquired by the detection unit 114. Specifically, the image information processing unit 302 creates a depth image from a stereo image acquired by the detection unit 114 to obtain a three-dimensional point cloud. Image data converted into the three-dimensional point cloud is used to detect an obstacle or a target that hinders traveling of the moving object 100. In addition, the image information processing unit 302 may include a machine learning model that processes image information, and may perform processing on a learning stage and processing on an inference stage of the machine learning model. The machine learning model of the image information processing unit 302 can perform processing of recognizing a three-dimensional object and the like included in the image information by performing computation of a deep learning algorithm using a deep neural network (DNN), for example.

A grid map generation unit 303 creates a grid map of a predetermined size (for example, in a region of 20 m×20 m with each cell of 10 cm×10 cm) based on the image data of the three-dimensional point cloud. This is intended to reduce the amount since the amount of data of the three-dimensional point cloud is large and real-time processing is difficult. The grid map includes, for example, a grid map indicating a difference between a maximum height and a minimum height of an intra-grid point cloud (representing whether or not the cell is a step) and a grid map indicating a maximum height of the intra-grid point cloud from a reference point (representing a topography shape of the cell). Furthermore, the grid map generation unit 303 removes spike noise and white noise included in the generated grid map, detects an obstacle having a predetermined height or more, and generates an occupancy grid map indicating whether or not there is a three-dimensional object as the obstacle for each grid.

A path generation unit 304 generates a traveling path of the moving object 100 with respect to the target position set by the user instruction acquisition unit 301. Specifically, the path generation unit 304 generates the path using the occupancy grid map generated by the grid map generation unit 303 from the captured image of the detection unit 114 without requiring obstacle information of a high-precision map. Note that the detection unit 114 is the stereo camera that captures the image of the front region of the moving object 100, and thus, is not able to recognize obstacles in the other directions, the topography, or the like. Therefore, it is desirable that the moving object 100 stores detected obstacle information for a predetermined period in order to avoid a collision with an obstacle outside a viewing angle and to avoid getting stuck in a dead end. As a result, the moving object 100 can generate the path in consideration of both an obstacle detected in the past and an obstacle detected in real time.

Further, the path generation unit 304 periodically generates a global path using the occupancy grid map, and periodically generates a local path so as to follow the global path. That is, a target position of the local path is determined by the global path. In the present embodiment, as a generation cycle of each path, the generation cycle of the global path is set to 100 ms, and the generation cycle of the local path is set to 50 ms, but the present invention is not limited thereto. As an algorithm for generating a global path, various algorithms such as a rapid-exploring random tree (RRT), a probabilistic road map (PRM), and A* are known. Further, since the differential two-wheeled mobility vehicle with the tail wheel is adopted as the moving object 100, the path generation unit 304 generates the local path in consideration of the tail wheel 121 which is the driven wheel. Further, according to the present embodiment, when generating the global path, the path generation unit 304 considers the posture angle of the moving object 100 at the current position and the posture angle of the path at the target position. By considering the position and the posture angle of the moving object 100 in this manner, it is possible to avoid turning at the current position or the target position.

The traveling control unit 305 controls the traveling of the moving object 100 in accordance with the local path. Specifically, the traveling control unit 305 controls the traveling unit 112 in accordance with the local path to control a speed and an angular velocity of the moving object 100. Further, the traveling control unit 305 controls traveling in response to various operations of a driver. When a deviation occurs in a driving plan of the local path due to an operation of the driver, the traveling control unit 305 may control traveling by acquiring a new local path generated by the path generation unit 304 again, or may control the speed and angular velocity of the moving object 100 so as to eliminate the deviation from the local path in use.

<Occupancy Grid Map>

Figure 4:
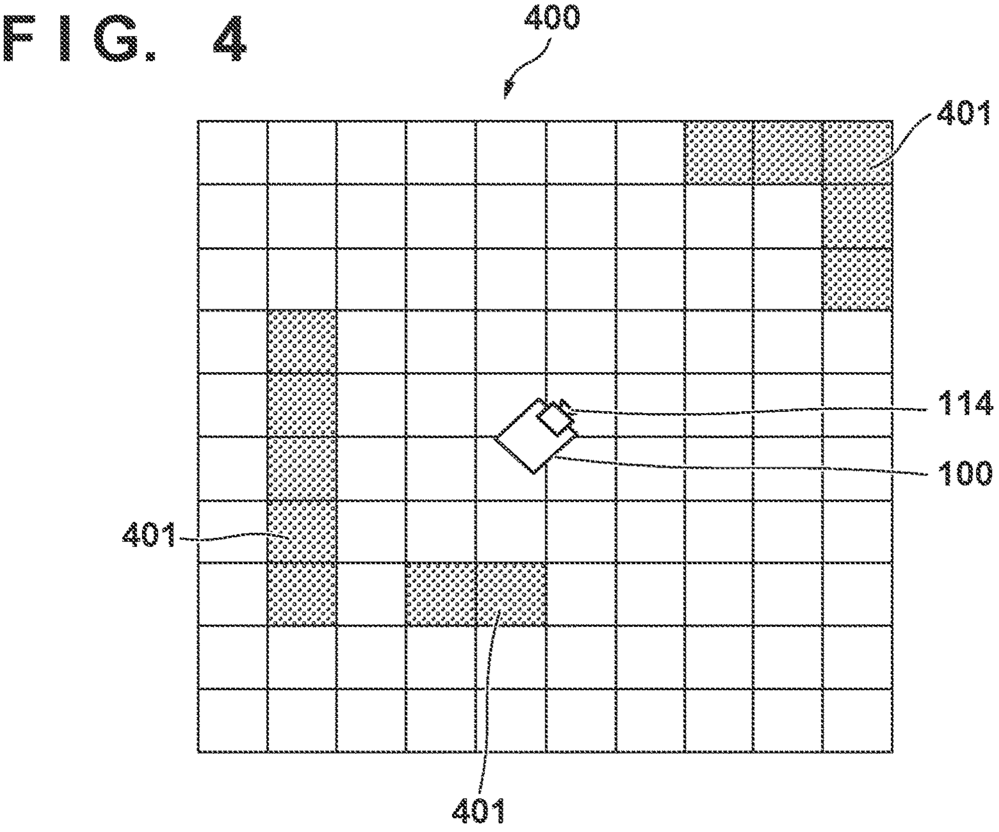
FIG. 4 is a diagram illustrating an occupancy grid map according to the embodiment.

FIG. 4 illustrates an occupancy grid map 400 including obstacle information according to the present embodiment. Since the moving object 100 according to the present embodiment travels without depending on obstacle information of a high-precision map, the obstacle information is entirely acquired from a recognition result of the detection unit 114. At this time, it is necessary to store the obstacle information in order to avoid a collision with an obstacle outside a viewing angle or getting stuck in a dead end. Therefore, in the present embodiment, an occupancy grid map is used as a method of storing the obstacle information from the viewpoint of reduction in the amount of information of a three-dimensional point cloud of a stereo image and ease of handling in path planning. Here, a map including obstacle information will be described. However, the map may include other target information or information such as an intersection instead of or in addition to the obstacle information.

The grid map generation unit 303 according to the present embodiment divides a peripheral region of the moving object 100 into grids, and generates an occupancy grid map including information indicating the presence or absence of an obstacle for each of the grids (divided regions). Note that an example in which a predetermined region is divided into grids will be described here. However, instead of being divided into grids, the predetermined region may be divided into other shapes to create an occupancy map indicating the presence or absence of an obstacle for each divided region. In addition, in the present invention, since a smooth curved path that does not depend on the divided region is generated, it is not essential to control division into a plurality of regions. In the occupancy grid map 400, a region having a size of, for example, 40 m×40 m or 20 m×20 m around the moving object 100 is set as the peripheral region, and the region is divided into grids of 20 cm×20 cm or 10 cm×10 cm and is dynamically set in accordance with movement of the moving object 100. That is, the occupancy grid map 400 is a region that is shifted such that the moving object 100 is always at the center in accordance with the movement of the moving object 100 and varies in real time. Note that any size of the region can be set based on hardware resources of the moving object 100.

Further, in the occupancy grid map 400, presence/absence information of an obstacle detected from the captured image by the detection unit 114 is defined for each grid. As the presence/absence information, for example, a travelable region is defined as “0”, and a non-travelable region (that is, presence of an obstacle) is defined as “1”. In FIG. 4, reference numeral 401 denotes a grid in which an obstacle is present. A region where an obstacle is present indicates a region through which the moving object 100 is not able to pass, and includes, for example, a three-dimensional object of 5 cm or more. Therefore, the moving object 100 generates a path so as to avoid these obstacles 401.

<Accumulation of Obstacle Information>

Figure 5:
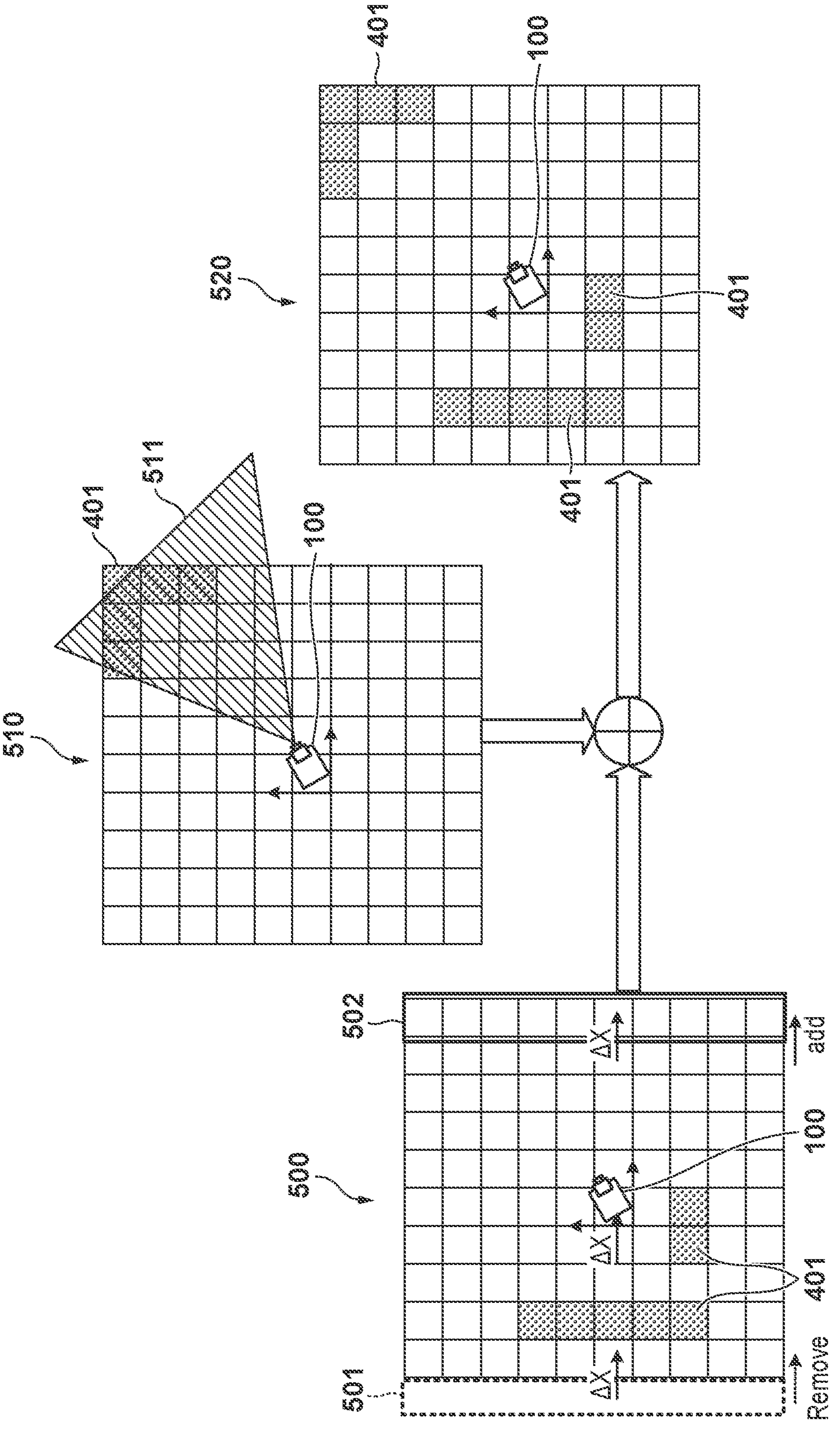
FIG. 5 is a diagram illustrating a method for generating the occupancy grid map according to the embodiment.

FIG. 5 illustrates accumulation of obstacle information in an occupancy grid map according to the present embodiment. Reference numeral 500 denotes a local map that moves in accordance with movement of the moving object 100. The local map 500 is shifted in accordance with the movement of the moving object 100 with respect to an x-axis direction and a y-axis direction on the grid map. The local map 500 illustrates a state in which a dotted line region of 501 is removed and a solid line region of 502 is added according to a movement amount Δx of the moving object 100 in the x-axis direction, for example. The region to be removed is a region opposite to an advancing direction of the moving object 100, and the region to be added is a region in the advancing direction. Similarly, regions are also removed and added in the y-axis direction in accordance with the movement of the moving object 100. Further, the local map 500 accumulates obstacle information detected in the past. When there is an obstacle in a grid included in the removed region, the obstacle information is removed from the local map 500, but is desirably held separately from the local map 500 for a certain period. Such information is effective, for example, in a case where the moving object 100 changes a course so that the removed region is included in the local map 500 again, and the avoidance accuracy of the moving object 100 with respect to the obstacle can be improved.

Reference numeral 510 denotes an obstacle detection map indicating detection information of an obstacle present in front of the moving object 100 from the captured image captured by the detection unit 114 of the moving object 100. The obstacle detection map 510 indicates real-time information, and is periodically generated based on the captured image acquired from the detection unit 114. Note that, since moving obstacles such as a person and a vehicle are also assumed, it is desirable to update the obstacle detection map 510 generated periodically within a viewing angle 511 of the detection unit 114, which is a front region of the moving object 100, instead of accumulating obstacles fixedly detected in the past. As a result, the moving obstacles can also be recognized, and generation of a path that avoids obstacles more than necessary can be prevented. On the other hand, the obstacles detected in the past are accumulated in a rear region (strictly speaking, outside the viewing angle of the detection unit 114) of the moving object 100 as illustrated in the local map 500. As a result, for example, when an obstacle is detected in the front region and a detour path is generated, it is possible to easily generate a path that avoids collisions with the passed obstacles.

Reference numeral 520 denotes an occupancy grid map generated by adding the local map 500 and the obstacle detection map 510. In this manner, the occupancy grid map 520 is generated as a grid map obtained by combining the local map and the obstacle detection information varying in real time with the obstacle information detected and accumulated in the past.

<Path Generation>

Figure 6:
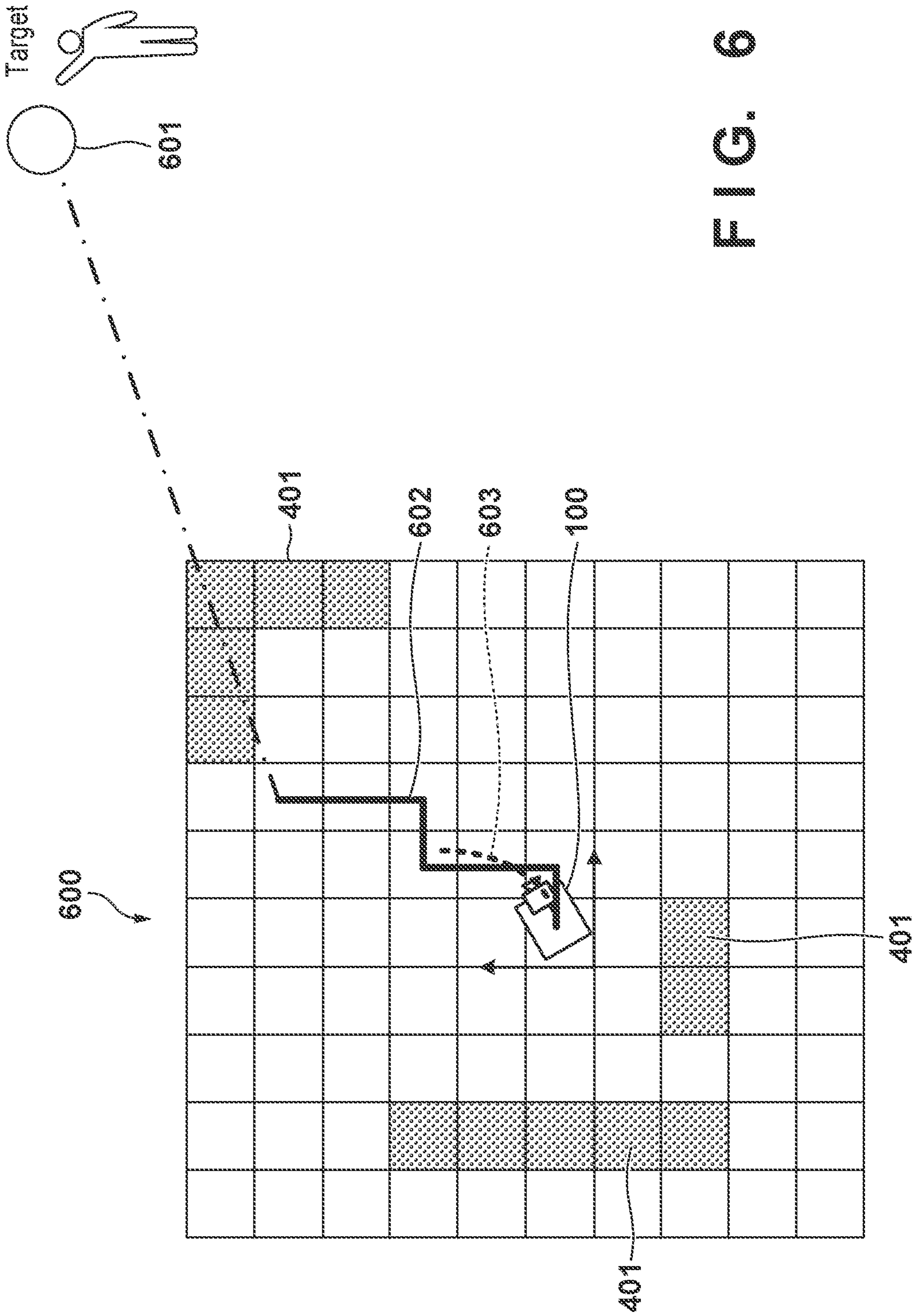
FIG. 6 is a diagram illustrating a global path and a local path according to the embodiment.

FIG. 6 illustrates a traveling path generated in the moving object 100 according to the present embodiment. The path generation unit 304 according to the present embodiment periodically generates a global path 602 using an occupancy grid map in accordance with a set target position 601, and periodically generates a local path 603 so as to follow the global path.

The target position 601 is set based on various instructions. For example, an instruction from an occupant riding on the moving object 100 and an instruction from a user outside the moving object 100 are included. The instruction from the occupant is performed via the operation panel 131 or the voice input apparatus 133. The instruction via the operation panel 131 may be a method of designating a predetermined grid of a grid map displayed on the operation panel 131. In this case, a size of each grid may be set to be large, and the grid may be selectable from a wider range of the map. The instruction via the voice input apparatus 133 may be an instruction using a surrounding target as a mark. The target may include a pedestrian, a signboard, a sign, equipment installed outdoors such as a vending machine, building components such as a window and an entrance, a road, a vehicle, a two-wheeled vehicle, and the like included in the utterance information. When receiving the instruction via the voice input apparatus 133, the path generation unit 304 detects a designated target from the captured image acquired by detection unit 114 and sets the target as the target position.

A machine learning model is used for these voice recognition and image recognition. The machine learning model performs, for example, computation of a deep learning algorithm using a deep neural network (DNN) to recognize a place name, a landmark name such as a building, a store name, a target name, and the like included in the utterance information and the image information. The DNN for the voice recognition becomes a learned state by performing the processing of the learning stage, and can perform recognition processing (processing of the inference stage) for new utterance information by inputting the new utterance information to the learned DNN. Further, the DNN for the image recognition can recognize a pedestrian, a signboard, a sign, equipment installed outdoors such as a vending machine, building components such as a window and an entrance, a road, a vehicle, a two-wheeled vehicle, and the like included in the image.

Further, regarding the instruction from the user outside the moving object 100, it is also possible to notify the moving object 100 of the instruction via the owned communication apparatus 140 via the communication unit 136 or call the moving object 100 by an operation such as raising a hand toward the moving object 100 as illustrated in FIG. 6. The instruction using the communication apparatus 140 is performed by an operation input or a voice input similarly to the instruction from the occupant.

When the target position 601 is set, the path generation unit 304 generates the global path 602 using the generated occupancy grid map. As a method of generating the global path, first, a path (first path) is generated at low calculation cost using a polynomial (parameter) to be described later, and if the generated path does not collide with the detected obstacle, the path is adopted as the global path. In the path generation method using the polynomial, it is possible to generate a path in consideration of the postures of the moving object 100 at the current position (self-vehicle position) and the target position in addition to generating a path at low calculation cost, and it is possible to reduce the turning control of the posture correction as much as possible. On the other hand, in a case where the generated path collides with an obstacle, various search algorithms such as RRT, PRM, and A* are known as path generation for avoiding the obstacle, but any method may be used. That is, according to the present embodiment, first, a path is simply generated using a polynomial described later, and a path for avoiding an obstacle is generated in a vicinity where the obstacle exists. Note that there is no intention to limit the present invention, and for example, whether or not an obstacle is detected in the vicinity of traveling is first determined. If there is no obstacle, path generation is performed by a polynomial, and if there is an obstacle, a global path may be generated by a search algorithm that avoids the obstacle. That is, the path generation method may be switched depending on the presence or absence of an obstacle.

When the global path is generated, the path generation unit 304 generates the local path 603 so as to follow the generated global path 602. As a method of local path planning, there are various methods such as a dynamic window approach (DWA), model predictive control (MPC), clothoid tentacles, and proportional-integral-differential (PID) control. Note that the global path 602 illustrated in FIG. 6 is a path depending on a grid of an occupancy grid map generated so as to avoid an obstacle, and illustrates a path that does not consider the position and the posture of the moving object 100. The local path generated based on such a path has a smooth curve, and the riding comfort of the occupant can be improved. On the other hand, since the position and the posture are not considered, depending on the angle of the tail wheel at the time of stopping, there is a possibility that sudden turning will occur at the time of the next departure. On the other hand, in the path generation using the polynomial, the global path is generated in consideration of the posture angle of the current position of the moving object 100 and the posture angle of the target position. In this case, since the global path is generated by a continuous curve, the path is a path formed by a smooth curve.

<Path Generation Using Polynomial>

Figure 7:
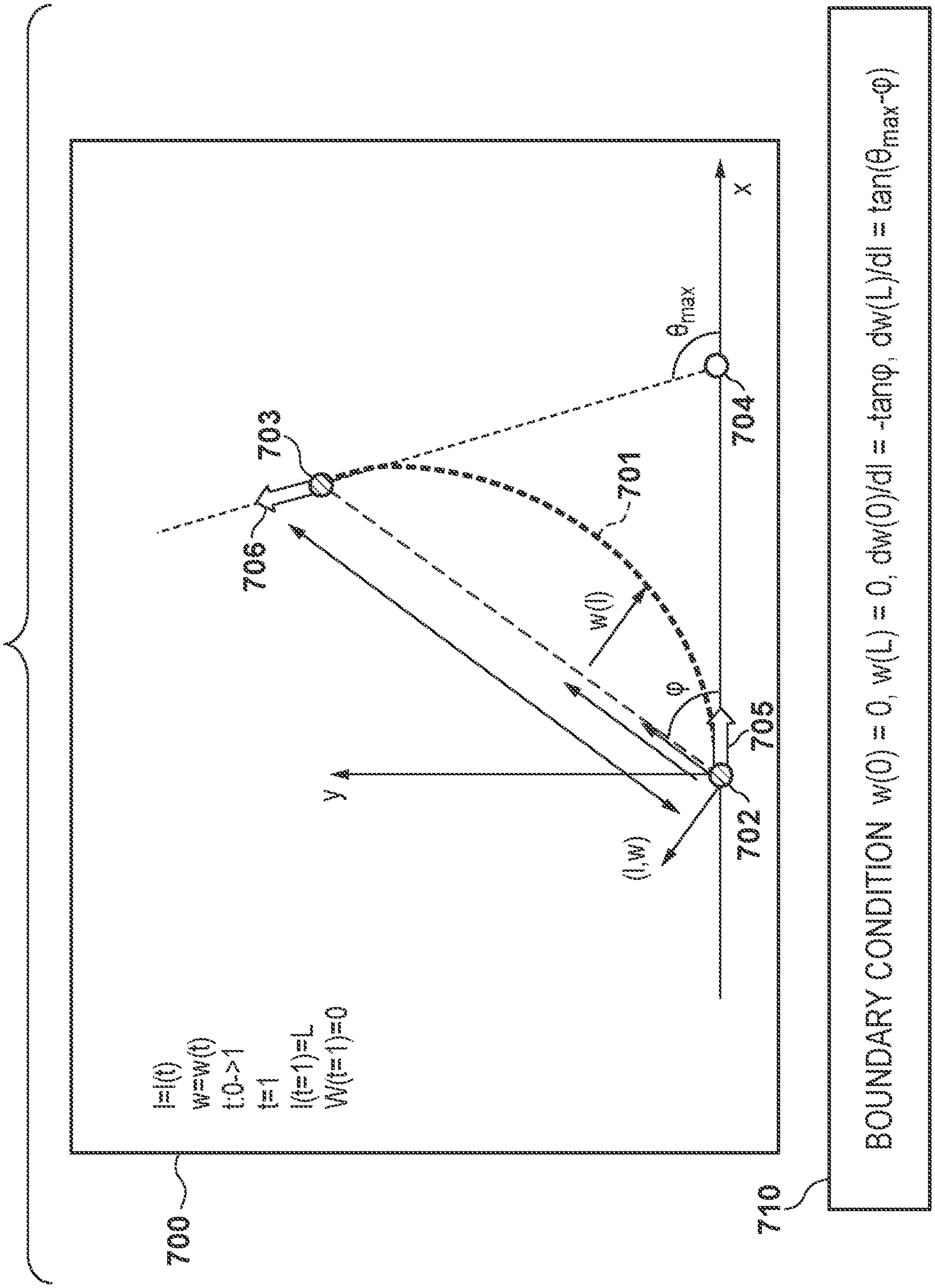
FIG. 7 is a diagram illustrating path generation in consideration of a position and a posture of the moving object according to the embodiment.
Figure 8:
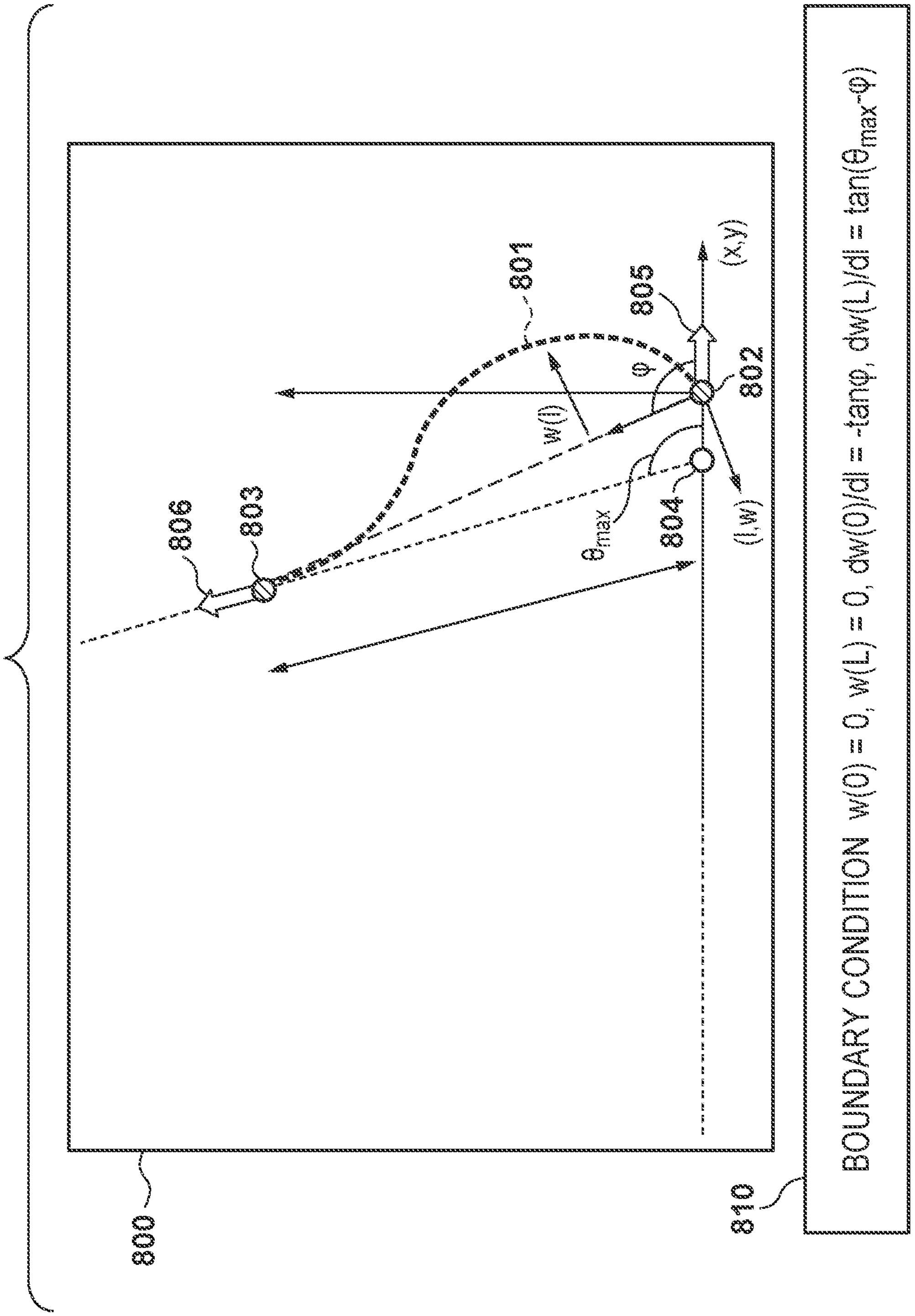
FIG. 8 is a diagram illustrating path generation in consideration of the position and the posture of the moving object according to the embodiment.

Next, a path generation method using a polynomial according to the present embodiment will be described with reference to FIGS. 7 and 8. Here, an example of generating a curved path using a polynomial (parameter) in a sidewalk, a public open space, or the like will be described. FIGS. 7 and 8 illustrate curved paths generated using polynomials. Note that, in addition to an algorithm for generating a polynomial curve described below, a path connecting a straight line to at least one of before and after the polynomial curve may be generated.

Reference numeral 700 denotes path generation using a polynomial. Reference numeral 701 denotes a path of the generated curve (polynomial curve). Reference numeral 702 denotes a current position of the moving object 100. Reference numeral 703 denotes a target position of the moving object 100. The target position 703 is different from the set final target position 601 and indicates a point closest to the moving object 100 among a plurality of intermediate points obtained by dividing the path to the target position 601. Reference numeral 705 denotes an advancing direction (posture angle) of the moving object 100 at the current position 702. Reference numeral 706 denotes a direction (posture angle) of the moving object 100 at the target position 703. Reference numeral 704 denotes an intersection point of a straight line in the advancing direction 705 at the current position and a straight line in the direction 706 at the target position.

Here, the advancing direction 705 of the moving object 100 is defined as an x-axis, and an axis orthogonal to the x-axis is defined as a y-axis (xy coordinates). Further, a straight line connecting the current position 702 and the target position 703 of the moving object 100 is defined as an l-axis, and a straight line orthogonal to the l-axis is defined as a w-axis (lw coordinates). According to the present embodiment, the path generation unit 304 converts the lw coordinates into the xy coordinates based on a predetermined boundary condition 710, and generates a path from the current position 702 to the target position 703 using the following Mathematical Formula (1). Note that R represents a rotation matrix.

$$\begin{bmatrix} x \\ y \end{bmatrix} = R(\phi)\begin{bmatrix} l \\ w \end{bmatrix} \quad \text{[Mathematical Formula 1]}$$

The boundary condition indicates a condition at the current position 702 and the target position 703 in the moving object 100. As illustrated in FIG. 7, the predetermined boundary condition 710 is set as follows, for example. w(0)=0, w(L)=0, dw(0)/dl=−tan φ, and dw(L)/dl=tan(θmax−φ)L indicate the distance (length) from the current position 702 to the target position 703. φ represents an angle formed by the x-axis and the l-axis. φmax represents an angle formed by the x-axis and the straight line in the direction 706 at an intersection point 704.

Here, since the predetermined boundary condition cannot be represented by w=w(l), it is represented as follows using the parameter. When the predetermined boundary condition 710 is rewritten in parameter display as $l(t)=a_0+a_1t+a_2t^2+a_3t^3 w(t)=b_0+b_1t+b_2t^2+b_3t^3$t: 0→1, it can be represented as the following Mathematical Formula (2).

$$l(0)=0,\ l(1)=L,\ w(0)=0,\ w(1)=0 \quad \text{[Mathematical Formula 2]}$$

$$\frac{dl(0)}{dt}=k_0\cos(-\phi),\ \frac{dl(1)}{dt}=k_1\cos(\theta_{max}-\phi),$$

$$\frac{dw(0)}{dt}=k_0\sin(-\phi),\ \frac{dw(1)}{dt}=k_1\sin(\theta_{max}-\phi)$$

$a_0$ to $a_3$ and $b_0$ to $b_3$ are obtained from the above Mathematical Formula (2). Note that the curvature can be changed by adjusting parameters $k_0$ and $k_1$. Although it is also possible to obtain the optimum parameters $k_0$ and $k_1$, it is desirable to adopt a method for obtaining an approximate solution since optimization affects generation of the global path at low calculation cost in the present embodiment. For example, the approximate solution of the parameters $k_0$ and $k_1$ can be analytically solved if a condition that the curvature becomes 0 at the current position and the target position is given.

Reference numeral 800 in FIG. 8 denotes a curved path 801 generated when a current position 802 of the moving object 100 is changed in a sidewalk, a public open space, or the like similar to that in FIG. 7. Similarly, reference numeral 803 denotes a target position of the moving object 100. Reference numeral 805 denotes an advancing direction (posture angle) of the moving object 100 at the current position 802. Reference numeral 806 denotes a direction (posture angle) of the moving object 100 at the target position 803. Reference numeral 804 denotes an intersection point of a straight line in the advancing direction 805 at the current position and a straight line in the direction 806 at the target position. As described with reference to FIG. 7, the path generation unit 304 generates a curved path from the current position 802 to the target position 803 using the above Mathematical Formula (1) and the boundary condition 810. It can be seen that the path 801 is generated as a polynomial curve including a plurality of curves. As described above, in the path generation by the polynomial curve in the present embodiment, curves of various shapes can be generated according to the posture at the current position and the posture at the target position. Furthermore, by generating a path connecting straight lines before and after the curve, a path to a final target position can be generated.

Figure 9:
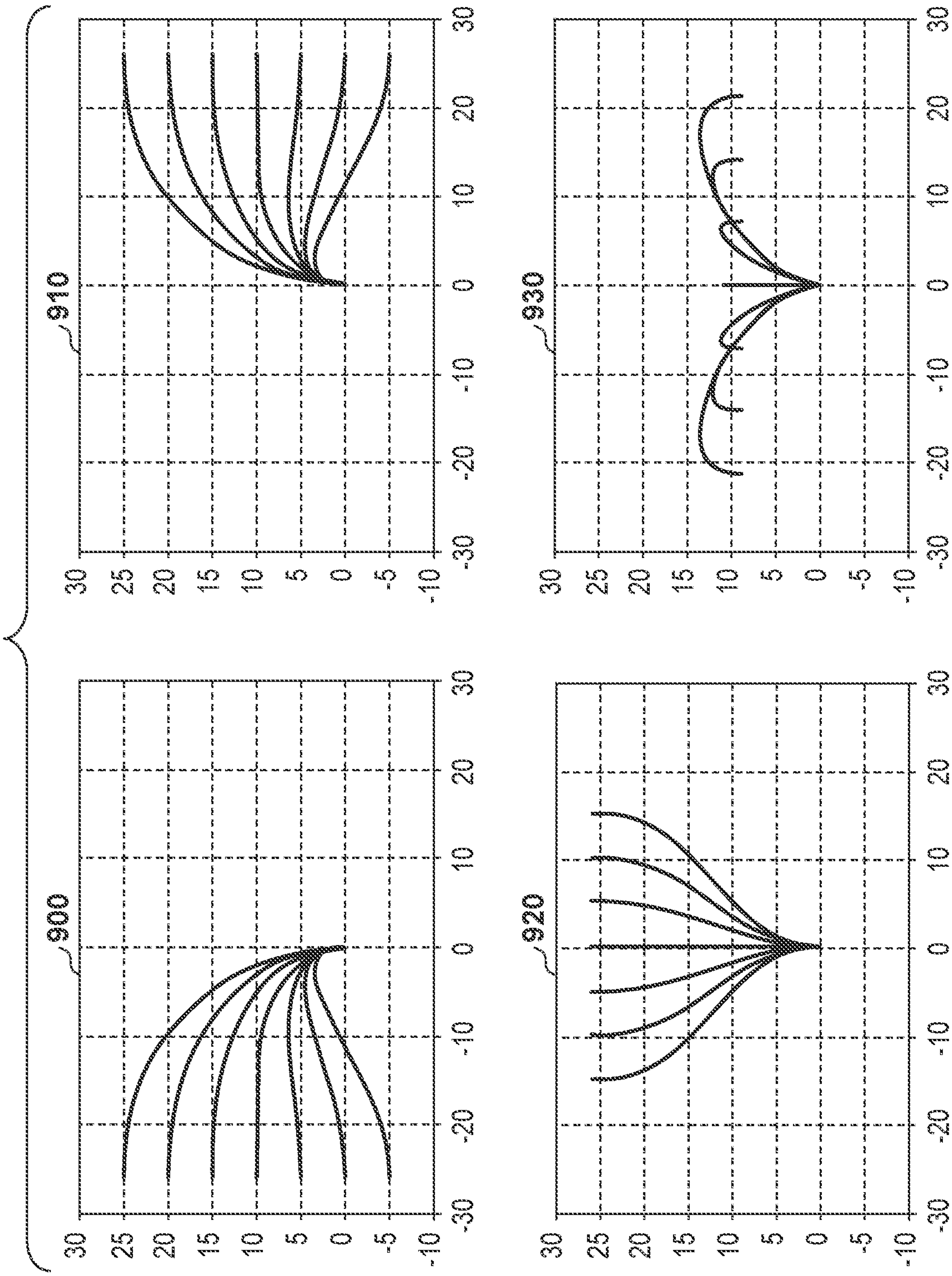
FIG. 9 is a diagram illustrating a path (polynomial curve) generated in consideration of the position and the posture of the moving object according to the embodiment.

FIG. 9 illustrates variations of the polynomial curve generated by the path generation unit 304 according to the present embodiment. Reference numeral 900 denotes a polynomial curve in a case where the moving object 100 turns left. Reference numeral 910 denotes a polynomial curve in a case where the moving object 100 turns right. Reference numeral 920 denotes a polynomial curve in a case where the moving object 100 changes lanes. Reference numeral 930 denotes a polynomial curve in a case where the moving object 100 makes a U-turn. In each graph illustrated in FIG. 9, a horizontal axis is defined as x, a vertical axis is defined as y, and (0, 0) is defined as a current position of the moving object 100. In the respective graphs, curves at a plurality of target positions are illustrated.

<Basic Control of Moving Object>

Figure 10:
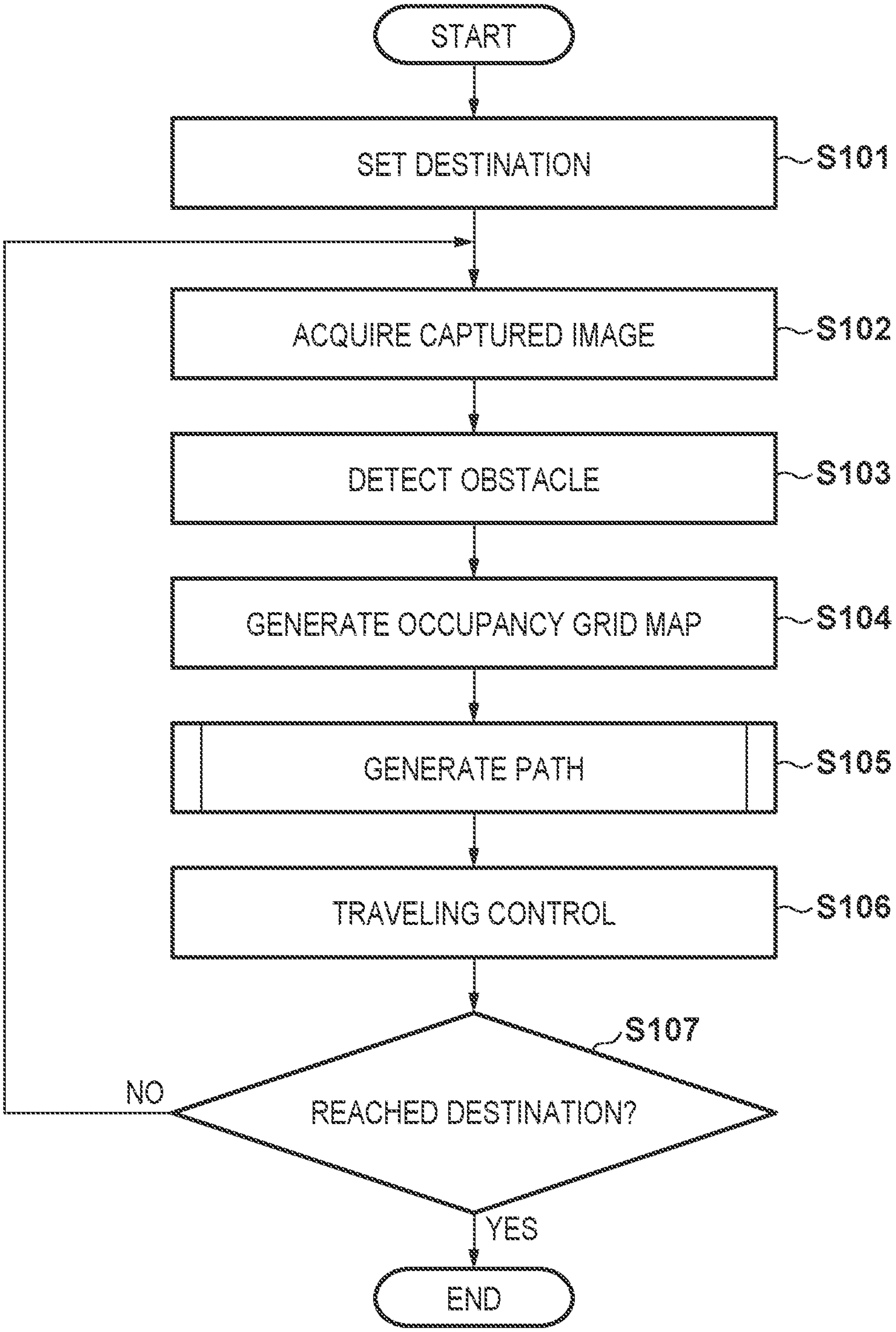
FIG. 10 is a flowchart illustrating a processing procedure for controlling traveling of the moving object according to the embodiment.

FIG. 10 is a flowchart illustrating basic control of the moving object 100 according to the present embodiment. Processing to be described below is achieved by, for example, the CPU in the control unit 130 reading a program stored in a memory such as a ROM into a RAM and executing the program.

In S101, the control unit 130 sets a target position of the moving object 100 based on a user instruction received by the user instruction acquisition unit 301. The user instruction can be received by various methods as described above. Subsequently, in S102, the control unit 130 captures an image of a front region of the moving object 100 by the detection unit 114, and acquires the captured image. The acquired captured image is processed by the image information processing unit 302, and a depth image is created and formed into a three-dimensional point cloud. In S103, the control unit 130 detects an obstacle that is a three-dimensional object of, for example, 5 cm or more from the image formed into the three-dimensional point cloud. In S104, the control unit 130 generates an occupancy grid map of a predetermined region around the moving object 100 based on the detected obstacle and position information of the moving object 100.

Next, in S105, the control unit 130 causes the path generation unit 304 to generate a traveling path of the moving object 100. As described above, the path generation unit 304 generates the global path using the polynomial curve, determines whether or not the generated path collides with the obstacle, and generates the global path by the search algorithm using the occupancy grid map when the generated path collides with the obstacle. Further, the path generation unit 304 generates a local path according to the generated global path. Subsequently, in S106, the control unit 130 determines a speed and an angular velocity of the moving object 100 according to the generated local path, and controls traveling. Thereafter, in S107, the control unit 130 determines whether or not the moving object 100 has reached the target position based on position information from the GNSS sensor 134, and when the moving object 100 does not reach the target position, the control unit 130 returns the processing to S102 to repeatedly perform the processing of generating a path and controlling traveling while updating the occupancy grid map. On the other hand, in a case where the moving object 100 has reached the target position, the processing of this flowchart ends.

<Global Path Generation Procedure>

Figure 11:
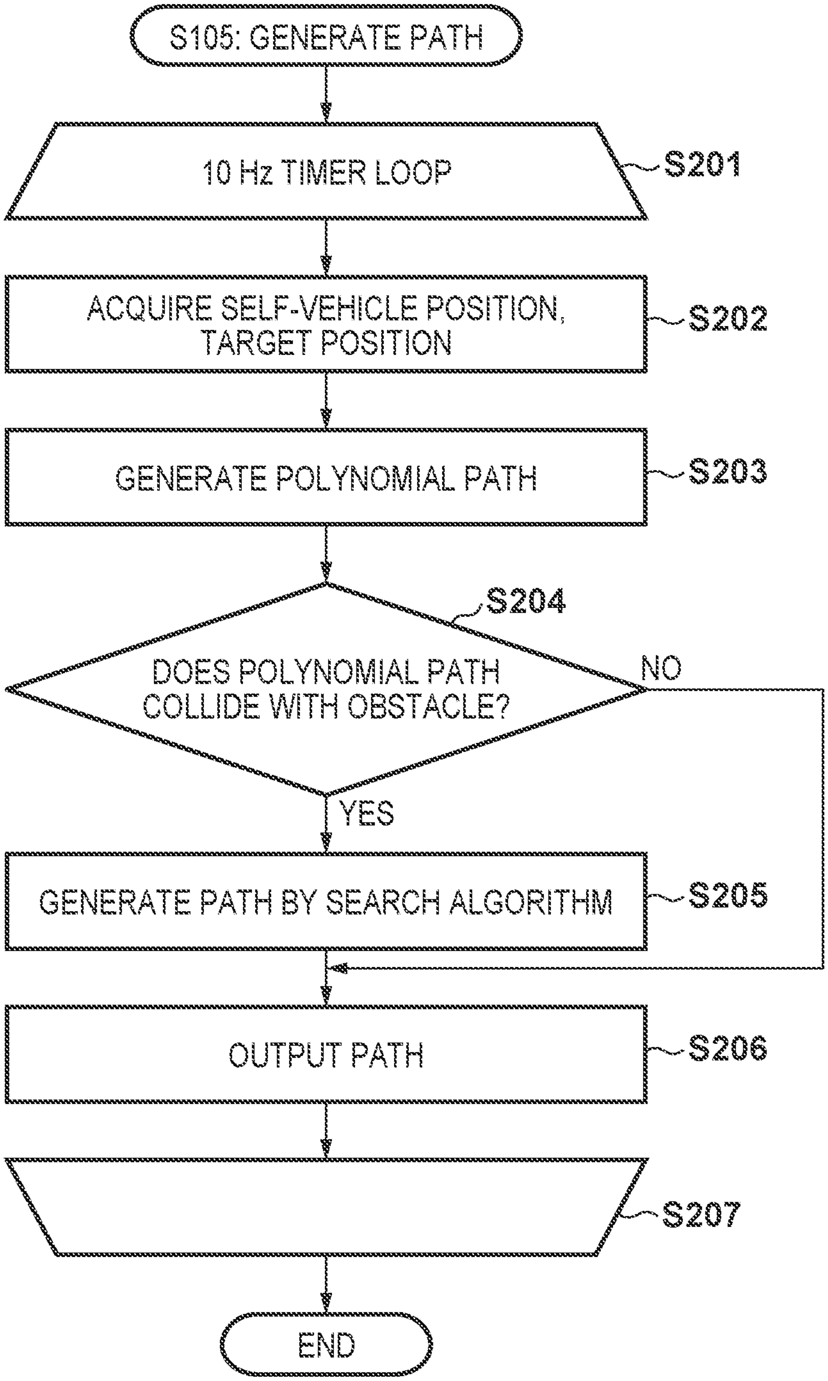
FIG. 11 is a flowchart illustrating a processing procedure for generating a global path according to the embodiment.

FIG. 11 is a flowchart illustrating a global path generation procedure performed in the path generation of S105 according to the present embodiment. Processing to be described below is achieved by, for example, the CPU in the control unit 130 reading a program stored in a memory such as a ROM into a RAM and executing the program.

S201 to S207 indicate the repetitive processing at 10 Hz. In S202, the control unit 130 acquires the current position and the target position, and the posture of the moving object 100 at each position. The target position acquired here may be the target position acquired in S101, or may be the nearest position when the position up to the target position is subdivided. In addition, the control unit 130 acquires, as the current position, information regarding the current self-vehicle position in the previously generated occupancy grid map and its posture. The information regarding the posture is acquired from a sensor group such as the detection unit 114.

Subsequently, in S203, the control unit 130 generates a polynomial path using the information acquired in S202 and the above Mathematical Formula (1). Further, in S204, the control unit 130 maps the polynomial path generated in S203 on the occupancy grid map generated in S104, and determines whether or not the path collides with an obstacle. A detailed determination method will be described later with reference to FIG. 12. When it is determined that the polynomial path collides with the obstacle, the process proceeds to S205, and the control unit 130 generates a global path by the search algorithm using the occupancy grid map instead of the polynomial path generated in S203, and advances the processing to S206. On the other hand, when it is determined that the polynomial path does not collide with the obstacle, the process proceeds to S206.

In S206, the control unit 130 outputs the polynomial path generated in S203, or in a case where the global path is generated by the search algorithm in S205, the path as the global path. Thereafter, the control unit 130 generates a local path based on the output global path, and performs traveling control in S106.

<Obstacle Collision Determination>

Figure 12:
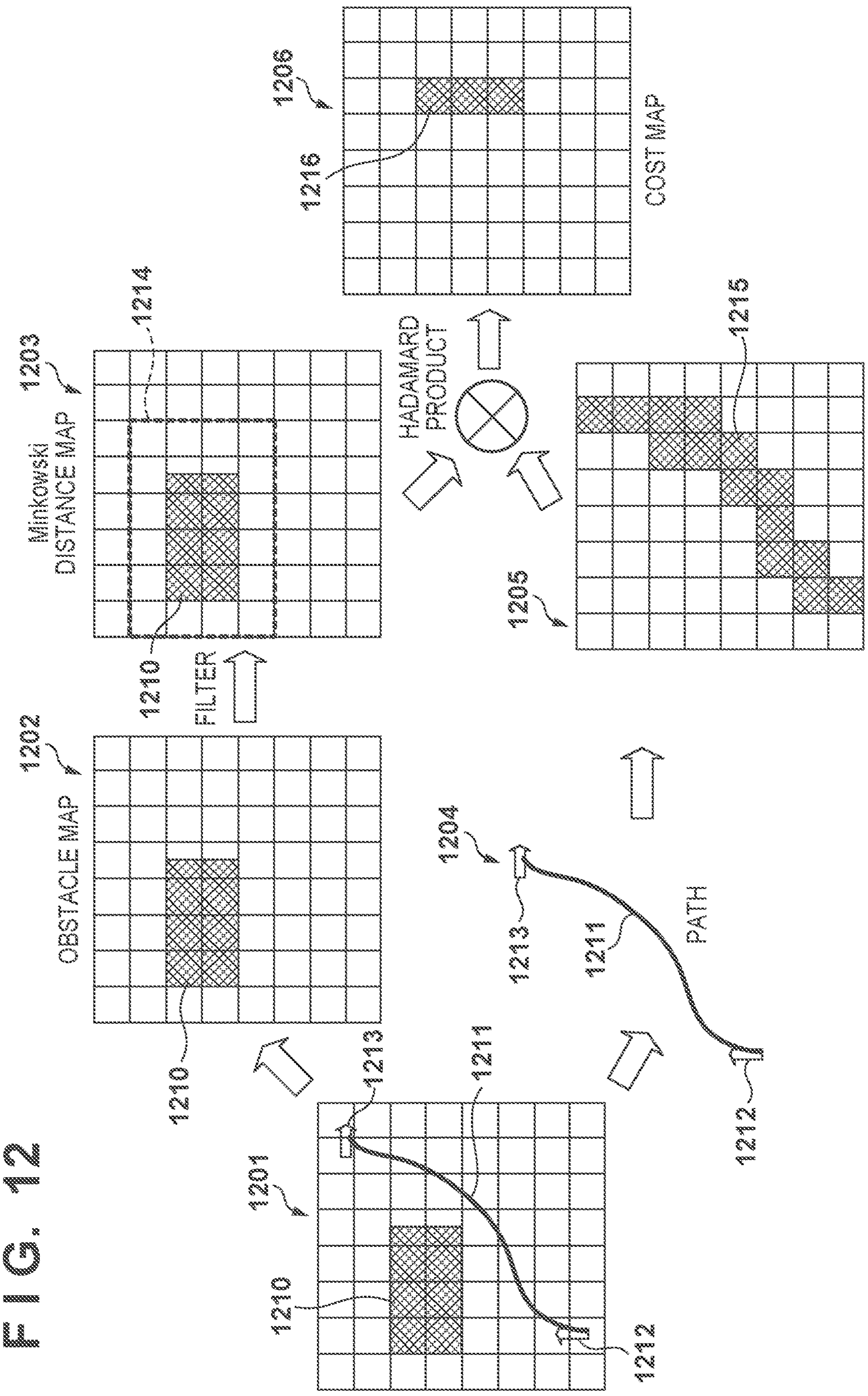
FIG. 12 is a diagram illustrating an obstacle collision determination procedure of a polynomial path according to the embodiment.

FIG. 12 is a diagram illustrating a determination method of obstacle collision determination of a polynomial path according to the present embodiment. Reference numeral 1201 denotes a state in which a detected obstacle 1210 and a generated polynomial path 1211 are displayed in a superimposed manner on the generated occupancy grid map. Reference numeral 1210 denotes a state in which the detected obstacle is mapped on the occupancy grid map. Reference numeral 1211 denotes the generated polynomial path. Reference numeral 1212 denotes a current position and a posture thereof. Reference numeral 1213 denotes a target position and a posture thereof.

Reference numeral 1202 denotes a state in which only an obstacle map is extracted from 1201. Reference numeral 1203 denotes a Minkowski distance map (first map) in a case where a margin of a vehicle width is considered from the obstacle map 1202. The Minkowski distance map 1203 is generated using a filter such as a uniform filter or a Gaussian filter. A region 1214 is an obstacle region in consideration of the vehicle width margin.

On the other hand, reference numeral 1204 denotes that the generated polynomial path 1211 is extracted from 1201. Reference numeral 1205 denotes a state in which the polynomial path 1211 is mapped on the occupancy grid map (second map). Reference numeral 1215 denotes a region through which the polynomial path 1211 passes on the occupancy grid map.

According to the present embodiment, a cost map 1206 (third map) is generated by the Hadamard product of the Minkowski distance map 1203 indicating the obstacle region in consideration of the margin of the vehicle width and the map 1205 of the polynomial path. That is, in the cost map 1206, a position where the region 1214 indicating the obstacle in consideration of the vehicle width and the region 1215 through which the polynomial path passes overlap is acquired. Reference numeral 1216 denotes the overlapping position, and in a case where such a region exists, it is determined that the generated polynomial path collides with the obstacle. On the other hand, when the region denoted by 1216 does not exist, it is determined that the generated polynomial path does not collide with the obstacle.

As described above, according to the present embodiment, in a sidewalk, a public open space, or the like, a polynomial path that can be generated at low calculation cost is first generated, whether or not the polynomial path collides with an obstacle is determined, and when the polynomial path collides with the obstacle, a global path is generated by a search algorithm using an occupancy grid map. On the other hand, when the polynomial path does not collide with the obstacle, the path can be generated at low calculation cost by using the polynomial path as the global path. Furthermore, at the time of generating the polynomial path, it is possible to generate a path in consideration of the posture of the moving object 100 at the current position and the target position, and to avoid traveling control such as sudden turning that gives discomfort to the occupant.

Second Embodiment

Hereinafter, a second embodiment of the present invention will be described. In the present embodiment, unlike the above embodiment, a method of using a polynomial path on a roadway will be described. In the present embodiment, path generation at an intersection will be described as an example of a case where the polynomial path is used on the roadway. Here, control on the premise that no obstacle is present at the intersection will be described. Therefore, in the present embodiment, in FIG. 10 illustrating basic control of a moving object 100, S103 and S104 may be omitted. Note that there is no intention to limit the present invention, and as described in the first embodiment, the presence or absence of an obstacle may also be detected at an intersection, and whether or not the generated polynomial path collides with the obstacle may be determined.

<Path Generation at Intersection Using Polynomial>

Figure 13:
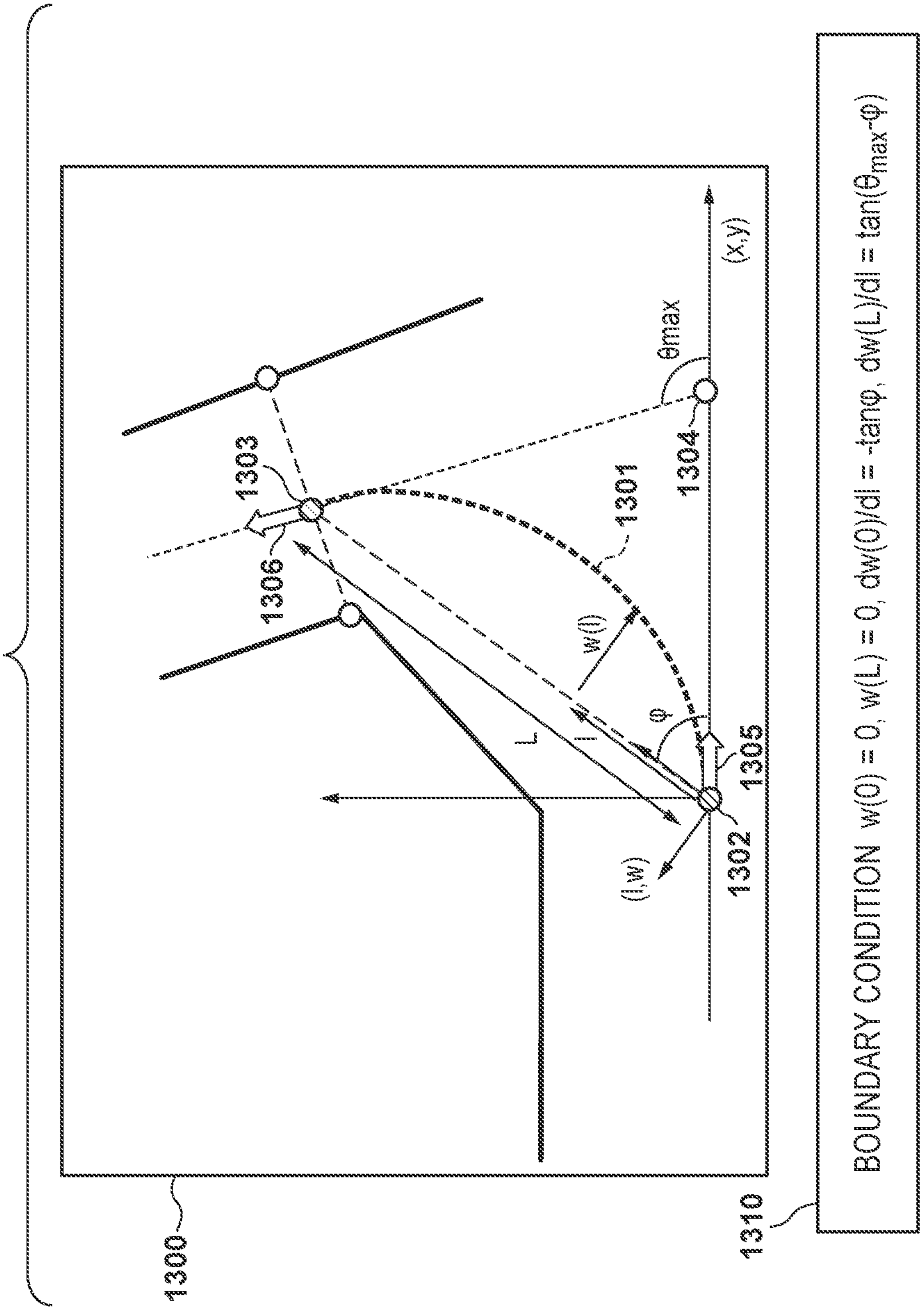
FIG. 13 is a diagram illustrating path generation at an intersection in consideration of a position and a posture of a moving object according to an embodiment.

Next, a path generation method using a polynomial according to the present embodiment will be described with reference to FIGS. 13 and 14. Here, an example of generating a path of a polynomial curve at an intersection or the like will be described. The generation method described below can be applied to generation of a curved path not only at an intersection in a roadway but also in a scene where an advancing direction of the moving object 100 changes due to a curve, a lane change, or the like. FIG. 13 corresponds to FIG. 7 of the first embodiment, and FIG. 14 corresponds to FIG. 8.

Reference numeral 1300 denotes path generation at the intersection. Reference numeral 1301 denotes a path of the generated polynomial curve. Reference numeral 1302 denotes a current position of the moving object 100. Reference numeral 1303 denotes a target position (here, an exit of the intersection is set) of the moving object 100. The target position 1303 is different from a set final target position 601 and indicates a point closest to the moving object 100 among a plurality of intermediate points obtained by dividing a path to the target position 601. For example, at the time of entering the intersection, the exit of the intersection is set as the target position. Reference numeral 1305 denotes an advancing direction (posture angle) of the moving object 100 at the current position 1302. Reference numeral 1306 denotes a direction (posture angle) of the moving object 100 at the target position 1303. Reference numeral 1304 denotes an intersection point of a straight line in the advancing direction 1305 at the current position and a straight line in the direction 1306 at the target position.

Here, the advancing direction 1305 of the moving object 100 is defined as an x-axis, and an axis orthogonal to the x-axis is defined as a y-axis (xy coordinates). Further, a straight line connecting the current position 1302 and the target position 1303 of the moving object 100 is defined as an l-axis, and a straight line orthogonal to the l-axis is defined as a w-axis (lw coordinates). According to the present embodiment, a path generation unit 304 converts the lw coordinates into the xy coordinates based on a predetermined boundary condition 1310, and generates a path from the current position 1302 to the target position 1303 using the above Mathematical Formula (1). Details have already been described in FIG. 7, and thus are omitted.

Figure 14:
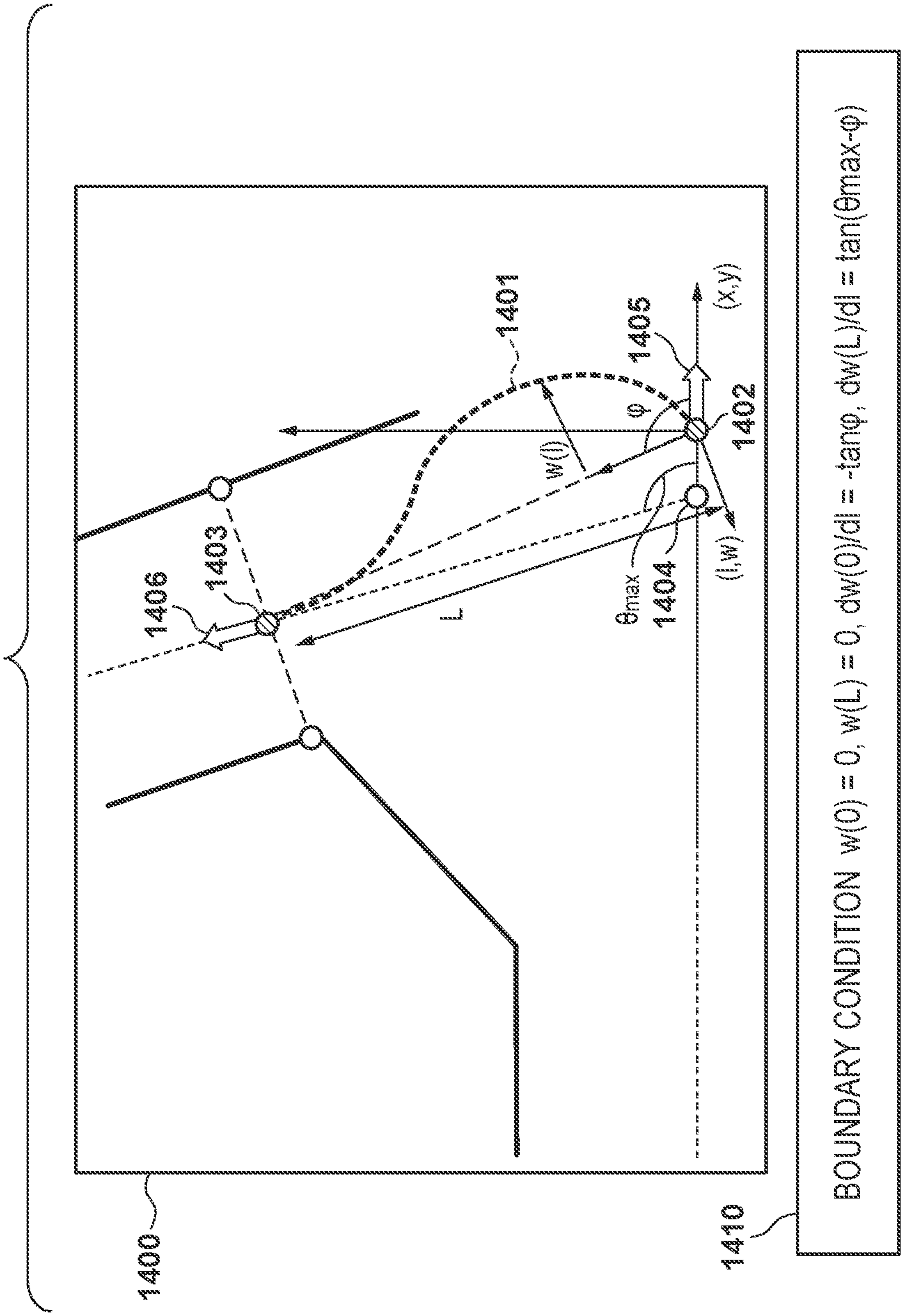
FIG. 14 is a diagram illustrating path generation at an intersection in consideration of the position and the posture of the moving object according to the embodiment.

Reference numeral 1400 in FIG. 14 denotes a curved path 1401 generated when the current position 1402 of the moving object 100 is changed at the intersection similar to that in FIG. 13. Similarly, reference numeral 1403 denotes a target position of the moving object 100. Reference numeral 1405 denotes an advancing direction (posture angle) of the moving object 100 at the current position 1402. Reference numeral 1406 denotes a direction (posture angle) of the moving object 100 at the target position 1403. Reference numeral 1404 denotes an intersection point of a straight line in the advancing direction 1405 at the current position and a straight line in the direction 1406 at the target position. As described with reference to FIG. 7, the path generation unit 304 generates a curved path from the current position 1402 to the target position 1403 using the above Mathematical Formula (1) and the boundary condition 810.

<Global Path Generation Procedure>

Figure 15:
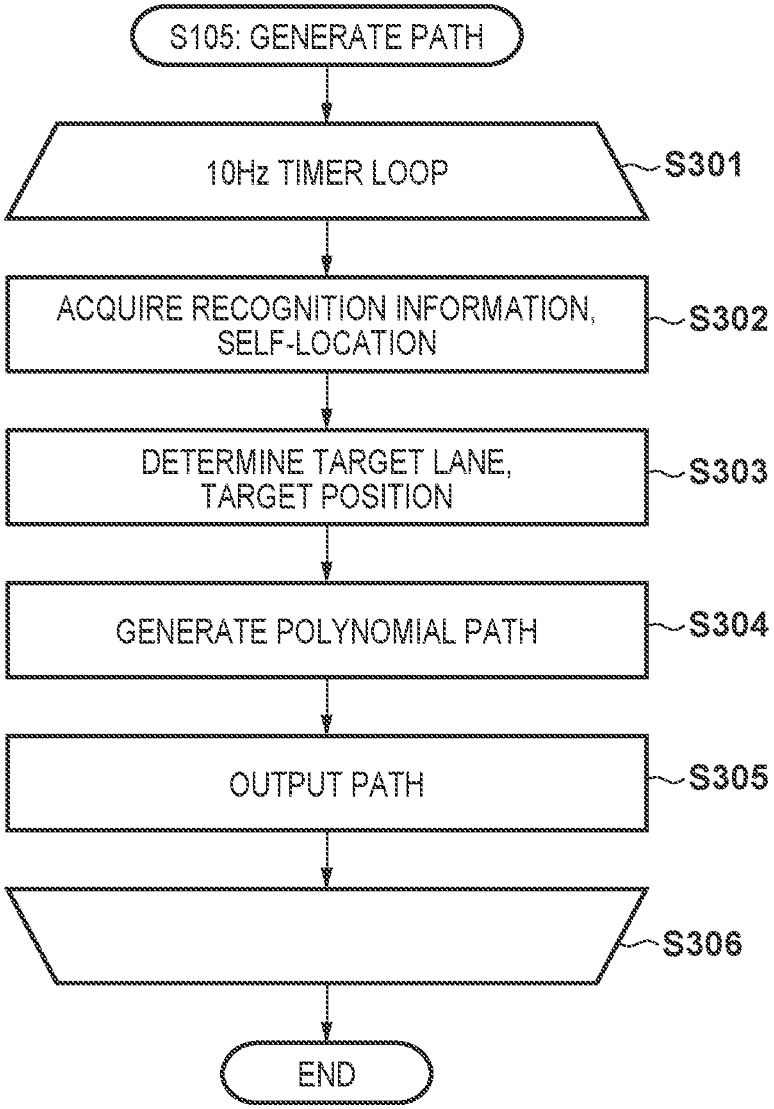
FIG. 15 is a flowchart illustrating a processing procedure for generating a global path at an intersection according to the embodiment.

FIG. 15 is a flowchart illustrating a global path generation procedure performed in the path generation of S105 according to the present embodiment. Processing to be described below is achieved by, for example, the CPU in the control unit 130 reading a program stored in a memory such as a ROM into a RAM and executing the program.

S301 to S306 indicate the repetitive processing at 10 Hz. In S302, the control unit 130 acquires the recognition information, and the current position and the posture of the moving object 100 at the position. Here, the recognition information indicates recognition information of a road structure. The recognition information of the road structure is to recognize a white line or the like from an image captured by a detection unit 114 and recognize a traveling lane, an intersection, a crosswalk, or the like of a road. The recognition information is output by a machine learning model that processes image information (captured image). The machine learning model performs processing of recognizing a road shape included in image information by performing computation of a deep learning algorithm using a deep neural network (DNN), for example. The recognition information includes information of various lines and various lanes of roads, a lane in which a self-vehicle is located (Ego lane), various intersections, road entrances (Road entrance) to various roads, and the like. Note that, since path generation at an intersection is assumed here, the acquired recognition information includes at least intersection information. Further, the control unit 130 acquires sensor information of a GNSS sensor 134 as the current position. The information regarding the posture is acquired from a sensor group such as the detection unit 114.

Subsequently, in S203, the control unit 130 determines a target lane and a target position that pass through the intersection based on the recognition information acquired in S202. For example, in a case where there are a plurality of lanes serving as the exit of the intersection from the recognition information, it is determined to which lane a path is to be generated among the plurality of lanes. Note that the advancing direction at the intersection is based on a direction instruction from an occupant, and is information regarding steering by the occupant.

When the target lane and the target position are determined, in S304, the control unit 130 generates a polynomial path using the information acquired in S302 and S303 and the above Mathematical Formula (1). Thereafter, in S305, the control unit 130 outputs the polynomial path generated in S304 as a global path. Thereafter, the control unit 130 generates a local path based on the output global path, and performs traveling control in S106.

As described above, according to the present embodiment, the polynomial path is generated in consideration of the postures of the current position and the target position in a traveling scene in which the presence or absence of the obstacle does not need to be detected. As a result, even when path generation is performed using the road recognition information, it is possible to avoid traveling control that gives discomfort to the occupant such as sudden turning.

<Lane Change>

Figure 16:
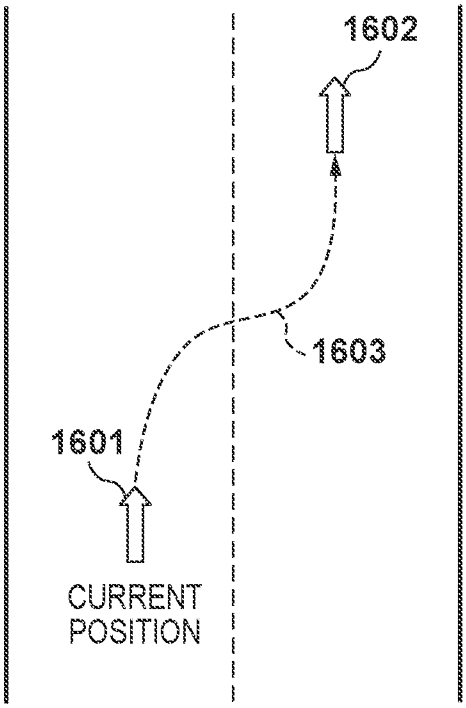
FIG. 16 is a diagram illustrating path generation in lane change of the moving object according to the embodiment.

FIG. 16 illustrates a polynomial path generated when the moving object 100 traveling on a roadway performs a lane change. Reference numeral 1601 denotes a current position and a direction (posture) of the moving object 100. Reference numeral 1602 denotes a target position and a direction (posture) of the target position. Reference numeral 1603 denotes a polynomial path generated in consideration of the current position 1601 and the target position 1602. As indicated by 1603, by considering the posture at the current position 1601 and the target position 1602, a path with a smooth curve can be generated, and it can be seen that the polynomial curve in the present invention is also useful for lane change.

Summary of Embodiments

1. A moving object control system (for example, 100) of the above embodiment comprises:

a setting unit (301, S101, S201) configured to set a current position and a target position of a moving object;

a path generation unit (FIG. 2, 304, S105) configured to generate a first path from the current position to the target position so as to satisfy a predetermined boundary condition on the lw coordinates in which a straight line connecting the current position and the target position of the moving object is defined as an l-axis and a straight line orthogonal to the l-axis is defined as a w-axis; and a conversion unit configured to convert the generated first path into the xy coordinates in which an advancing direction of the moving object is defined as an x-axis and an axis orthogonal to the x-axis is defined as a y-axis.

According to this embodiment, it is possible to suitably generate a traveling path in consideration of the position and the posture of the vehicle.

2. in the moving object control system of the above embodiment, the path generation unit generates a curved path by setting a curvature of a path at at least one of the current position and the target position to 0 as the predetermined boundary condition (FIG. 7).

According to this embodiment, the curvatures of the current position and the target position are set to 0, the polynomial can be solved analytically, and lower calculation cost can be realized.

3. in the moving object control system of the above embodiment, the system further comprises:

an acquisition unit (114) configured to acquire a captured image of a periphery of the moving object;

a detection unit (302) configured to detect an obstacle included in the captured image;

a map generation unit (303) configured to divide a peripheral region of the moving object into a plurality of regions, and generate an occupancy map indicating occupancy of the obstacle detected by the detection unit for each grid; and a determination unit (S204) configured to determine whether or not the converted first path collides with the obstacle included in the occupancy map, wherein when it is determined by the determination unit that the first path collides with the obstacle included in the occupancy map, the path generation unit generates a second path for avoiding the obstacle using a search algorithm (S205).

According to this embodiment, first, a polynomial path is generated at low calculation cost, and when the path collides with an obstacle, a path for avoiding the obstacle can be generated by a search algorithm, and the obstacle can be avoided while the calculation cost is suppressed as much as possible.

4. in the moving object control system of the above embodiment, wherein the determination unit includes a unit (1203) generating a first map obtained by converting a region of the obstacle detected by the detection unit into a region in consideration of a vehicle width, a unit (1205) generating a second map in which the first path is mapped on the occupancy map, and a unit (1206) generating a third map indicating whether or not the first path collides with the obstacle detected by the detection unit by the Hadamard product of the first map and the second map.

According to this embodiment, it is possible to simply and more safely determine the collision of the polynomial path generated at low calculation cost with the obstacle.

5. in the moving object control system of the above embodiment, the system further comprises:

an acquisition unit (114) configured to acquire a captured image of a periphery of the moving object; and a recognition unit (302) configured to recognize a road shape included in the captured image, wherein the setting unit sets the current position and the target position based on information regarding the captured image and recognition information by the recognition unit (S302).

According to this embodiment, it is possible to generate a path in consideration of the position and the posture of the vehicle using the polynomial path even on a roadway on which the occupancy grid map is not generated.

6. in the moving object control system of the above embodiment, wherein the path generation unit generates a path at an intersection, and the setting unit sets a lane to be an exit of the intersection as the target position when the moving object enters the intersection (S302, FIGS. 13-14).

According to this embodiment, it is possible to generate a path in consideration of the position and the posture of the vehicle using the polynomial path at the intersection.

7. in the moving object control system of the above embodiment, the system further comprises:

an acquisition unit (114) configured to acquire a captured image of a periphery of the moving object;

a detection unit (302) configured to detect an obstacle included in the captured image; and a map generation unit (303) configured to divide a peripheral region of the moving object into a plurality of regions, and generate an occupancy map indicating occupancy of the obstacle detected by the detection unit for each grid, wherein the path generation unit gives priority to generation of the first path in a vicinity where the obstacle does not exist, and gives priority to generation of a second path for avoiding the obstacle in a vicinity where the obstacle exists.

According to this embodiment, it is possible to accurately avoid an obstacle while generating a path in consideration of the position and the posture of the vehicle according to the presence or absence of the obstacle.

The invention is not limited to the foregoing embodiments, and various variations/changes are possible within the spirit of the invention.

What is claimed is:

1. A moving object control system comprising:

a storage device that stores instructions; and at least one processor that executes the instructions to:

set a current position and a target position of a moving object;

generate, using a polynomial, a first path from the current position to the target position that satisfies a predetermined boundary condition on lw coordinates in which a straight line connecting the current position and the target position of the moving object is defined as an l-axis and a straight line orthogonal to the l-axis is defined as a w-axis, wherein the predetermined boundary condition includes conditions regarding a posture of the moving object at the current position and a posture of the moving object at the target position;

convert the generated first path into xy coordinates in which an advancing direction of the moving object is defined as an x-axis and an axis orthogonal to the x-axis is defined as a y-axis generate a curved path by setting a curvature of a path at at least one of the current position and the target position to 0 as the predetermined boundary condition;

acquire a captured image of a periphery of the moving object;

detect an obstacle included in the captured image;

divide a peripheral region of the moving object into a plurality of regions, and generate an occupancy map indicating occupancy of the detected obstacle for each grid;

determine whether or not the converted first path collides with the obstacle included in the occupancy map;

generate a first map obtained by converting a region of the detected obstacle into a region in consideration of a vehicle width, generate a second map in which the first path is mapped on the occupancy map, and generate a third map indicating whether or not the first path collides with the detected obstacle by a Hadamard product of the first map and the second map;

when it is determined that the first path collides with the obstacle included in the occupancy map, generate a second path for avoiding the obstacle using a search algorithm;

control the moving object to travel along the first path when it is determined that the first path does not collide with the obstacle included in the occupancy map; and control the moving object to travel along the second path when the second path is generated.

2. The moving object control system according to claim 1, wherein the at least one processor further executes instructions in the storage device to:

acquire a captured image of a periphery of the moving object;

recognize a road shape included in the captured image; and set the current position and the target position based on information regarding the captured image and recognized road shape.

3. The moving object control system according to claim 2, wherein the at least one processor further executes instructions in the storage device to:

generate a path at an intersection, and set a lane to be an exit of the intersection as the target position when the moving object enters the intersection.

4. The moving object control system according to claim 1, wherein the at least one processor further executes instructions in the storage device to:

acquire a captured image of a periphery of the moving object;

detect an obstacle included in the captured image;

divide a peripheral region of the moving object into a plurality of regions, and generate an occupancy map indicating occupancy of the detected obstacle for each grid; and give priority to generation of the first path in a vicinity where the obstacle does not exist, and give priority to generation of a second path for avoiding the obstacle in a vicinity where the obstacle exists.

5. A control method of a moving object control system, comprising:

setting a current position and a target position of a moving object;

generating, using a polynomial, a first path from the current position to the target position that satisfies a predetermined boundary condition on lw coordinates in which a straight line connecting the current position and the target position of the moving object is defined as an l-axis and a straight line orthogonal to the l-axis is defined as a w-axis, wherein the predetermined boundary condition includes conditions regarding a posture of the moving object at the current position and a posture of the moving object at the target position; and converting the generated first path into xy coordinates in which an advancing direction of the moving object is defined as an x-axis and an axis orthogonal to the x-axis is defined as a y-axis;

generating a curved path by setting a curvature of a path at at least one of the current position and the target position to 0 as the predetermined boundary condition;

acquiring a captured image of a periphery of the moving object;

detecting an obstacle included in the captured image;

dividing a peripheral region of the moving object into a plurality of regions, and generating an occupancy map indicating occupancy of the detected obstacle for each grid;

determining whether or not the converted first path collides with the obstacle included in the occupancy map;

generating a first map obtained by converting a region of the detected obstacle into a region in consideration of a vehicle width, generating a second map in which the first path is mapped on the occupancy map, and generating a third map indicating whether or not the first path collides with the detected obstacle by a Hadamard product of the first map and the second map;

when it is determined that the first path collides with the obstacle included in the occupancy map, generating a second path for avoiding the obstacle using a search algorithm;

controlling the moving object to travel along the first path when it is determined that the first path does not collide with the obstacle included in the occupancy map; and controlling the moving object to travel along the second path when the second path is generated.

6. A non-transitory storage medium storing a program for causing a computer to implement each step of a control method of a moving object control system, comprising:

setting a current position and a target position of a moving object;

generating, using a polynomial, a first path from the current position to the target position that satisfies a predetermined boundary condition on lw coordinates in which a straight line connecting the current position and the target position of the moving object is defined as an l-axis and a straight line orthogonal to the l-axis is defined as a w-axis, wherein the predetermined boundary condition includes conditions regarding a posture of the moving object at the current position and a posture of the moving object at the target position;

converting the generated first path into xy coordinates in which an advancing direction of the moving object is defined as an x-axis and an axis orthogonal to the x-axis is defined as a y-axis generating a curved path by setting a curvature of a path at at least one of the current position and the target position to 0 as the predetermined boundary condition;

acquiring a captured image of a periphery of the moving object;

detecting an obstacle included in the captured image;

dividing a peripheral region of the moving object into a plurality of regions, and generating an occupancy map indicating occupancy of the detected obstacle for each grid;

determining whether or not the converted first path collides with the obstacle included in the occupancy map;

generating a first map obtained by converting a region of the detected obstacle into a region in consideration of a vehicle width, generating a second map in which the first path is mapped on the occupancy map, and generating a third map indicating whether or not the first path collides with the detected obstacle by a Hadamard product of the first map and the second map;

when it is determined that the first path collides with the obstacle included in the occupancy map, generating a second path for avoiding the obstacle using a search algorithm;

controlling the moving object to travel along the first path when it is determined that the first path does not collide with the obstacle included in the occupancy map; and controlling the moving object to travel along the second path when the second path is generated.

7. A moving object comprising:

a storage device that stores instructions; and at least one processor that executes the instructions to:

set a current position and a target position of the moving object;

generate, using a polynomial, a first path from the current position to the target position that satisfies a predetermined boundary condition on lw coordinates in which a straight line connecting the current position and the target position of the moving object is defined as an l-axis and a straight line orthogonal to the l-axis is defined as a w-axis, wherein the predetermined boundary condition includes conditions regarding a posture of the moving object at the current position and a posture of the moving object at the target position;

convert the generated first path into xy coordinates in which an advancing direction of the moving object is defined as an x-axis and an axis orthogonal to the x-axis is defined as a y-axis generate a curved path by setting a curvature of a path at at least one of the current position and the target position to 0 as the predetermined boundary condition;

acquire a captured image of a periphery of the moving object;

detect an obstacle included in the captured image;

divide a peripheral region of the moving object into a plurality of regions, and generate an occupancy map indicating occupancy of the detected obstacle for each grid;

determine whether or not the converted first path collides with the obstacle included in the occupancy map;

generate a first map obtained by converting a region of the detected obstacle into a region in consideration of a vehicle width, generate a second map in which the first path is mapped on the occupancy map, and generate a third map indicating whether or not the first path collides with the detected obstacle by a Hadamard product of the first map and the second map;

when it is determined that the first path collides with the obstacle included in the occupancy map, generate a second path for avoiding the obstacle using a search algorithm;

control the moving object to travel along the first path when it is determined that the first path does not collide with the obstacle included in the occupancy map; and control the moving object to travel along the second path when the second path is generated.

* * * * *